(12) United States Patent
Grzyska et al.

(10) Patent No.: US 12,227,716 B2
(45) Date of Patent: *Feb. 18, 2025

(54) DURABLE MAGNET WIRES AND LUBRICATING FLUIDS FOR ELECTRIC AND HYBRID VEHICLE APPLICATIONS

(71) Applicant: Afton Chemical Corporation, Richmond, VA (US)

(72) Inventors: Piotr Grzyska, Mechanicsville, VA (US); Yungwan Kwak, Glen Allen, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,144

(22) Filed: Oct. 3, 2023

(65) Prior Publication Data

US 2024/0034953 A1    Feb. 1, 2024

Related U.S. Application Data

(63) Continuation of application No. 17/709,977, filed on Mar. 31, 2022, now Pat. No. 11,814,599.

(51) Int. Cl.
*C10M 169/04* (2006.01)
*B60K 1/00* (2006.01)
(Continued)

(52) U.S. Cl.
CPC .............. *C10M 169/04* (2013.01); *B60K 1/00* (2013.01); *B60K 11/02* (2013.01); *C10M 105/04* (2013.01); *C10M 105/36* (2013.01); *C10M 111/02* (2013.01); *C10M 125/04* (2013.01); *H02K 9/19* (2013.01); *C10M 2203/0206* (2013.01); *C10M 2203/024* (2013.01);
(Continued)

(58) Field of Classification Search
CPC ................... C10M 169/04; C10M 105/04; C10M 105/36; C10M 111/02; C10M 125/04; C10M 2203/0206; C10M 2203/024; C10M 2207/2805; B60K 1/00; B60K 11/02; H02K 9/19; C10N 2010/04; C10N 2030/04; C10N 2040/16
See application file for complete search history.

(56) References Cited

U.S. PATENT DOCUMENTS 3,634,515 A   1/1972   Piasek et al.
4,029,588 A   6/1977   Koch
(Continued)

FOREIGN PATENT DOCUMENTS

JP   2012207083 A   10/2012
WO   2017168749 A1   10/2017

OTHER PUBLICATIONS

Yau et al., "Modern Size Exclusion Liquid Chromatography", John Wiley and Sons, New York, 1979.
(Continued)

*Primary Examiner* — Ellen M McAvoy
(74) *Attorney, Agent, or Firm* — Honigman LLP (57) ABSTRACT

The present disclosure relates to a driveline for an electric or hybrid-electric vehicle including an electric motor with an insulated magnet wire and a lubricating and cooling fluid configured to maintain the durability of the magnet wire.

23 Claims, 1 Drawing Sheet

(51) Int. Cl.
  *B60K 11/02* (2006.01)
  *C10M 105/04* (2006.01)
  *C10M 105/36* (2006.01)
  *C10M 111/02* (2006.01)
  *C10M 125/04* (2006.01)
  *H02K 9/19* (2006.01)
  *C10N 10/04* (2006.01)
  *C10N 30/04* (2006.01)
  *C10N 40/16* (2006.01)

(52) U.S. Cl.
  CPC . *C10M 2207/2805* (2013.01); *C10N 2010/04* (2013.01); *C10N 2030/04* (2013.01); *C10N 2040/16* (2013.01)

(56) References Cited

U.S. PATENT DOCUMENTS

| | | |
|---|---|---|
| 4,152,499 A | 5/1979 | Boerzel et al. |
| 4,234,435 A | 11/1980 | Meinhardt et al. |
| 4,350,737 A | 9/1982 | Saunders et al. |
| 5,266,223 A | 11/1993 | Song et al. |
| 5,334,321 A | 8/1994 | Harrison et al. |
| 5,739,355 A | 4/1998 | Gateau et al. |
| 6,300,291 B1 | 10/2001 | Hartley et al. |
| 6,723,685 B2 | 4/2004 | Hartley et al. |
| 7,214,649 B2 | 5/2007 | Loper et al. |
| 7,645,726 B2 | 1/2010 | Loper |
| 7,732,390 B2 | 6/2010 | Kadkhodayan et al. |
| 7,897,696 B2 | 3/2011 | Huang et al. |
| 8,048,831 B2 | 11/2011 | Loper |
| 9,896,634 B2 | 2/2018 | Gao et al. |
| 11,326,123 B1 | 5/2022 | Adhvaryu et al. |
| 2012/0101017 A1 | 4/2012 | Duggal |
| 2012/0208731 A1 | 8/2012 | Lann et al. |
| 2014/0018271 A1 | 1/2014 | Onumata et al. |
| 2018/0286532 A1 | 10/2018 | Oya |
| 2018/0375396 A1 | 12/2018 | Ikeda et al. |
| 2019/0002785 A1 | 1/2019 | Sanson et al. |
| 2019/0002790 A1 | 1/2019 | Sanson et al. |
| 2019/0165634 A1* | 5/2019 | Whaley .................. H02K 1/182 |
| 2021/0009920 A1 | 1/2021 | Kwak |
| 2021/0012922 A1 | 1/2021 | Hara et al. |
| 2021/0122994 A1 | 4/2021 | Fang et al. |
| 2022/0064560 A1 | 3/2022 | Nakazawa |
| 2022/0131205 A1 | 4/2022 | Champagne |
| 2022/0333029 A1 | 10/2022 | Scherer et al. |

OTHER PUBLICATIONS

Thomas Sorrell, "Organic Chemistry", University Science Books, Sausolito: 1999.
Smith, Ed, et al., "March's Advanced Organic Chemistry", 5th Ed. John Wile & Sons, New York: 2001.
Periodic Table of the Elements, CAS version, Handbook of Chemistry and Physics, 75th Ed.
Fuels and Lubricants Handbook, Technology, Properties, Performance, and Testing, George Totten, editor, ASTM International, 2003.
European Search Report issued in Applicaiton No. 23164256.2 mailed on Aug. 2, 2023, 8 pages.
Extended European Search Report for European Patent Application 23164256.2, dated Aug. 2, 2023.

* cited by examiner

DURABLE MAGNET WIRES AND LUBRICATING FLUIDS FOR ELECTRIC AND HYBRID VEHICLE APPLICATIONS

CROSS-REFERENCE TO RELATED APPLICATIONS

This application is a continuation of U.S. patent application Ser. No. 17/709,977 filed on Mar. 31, 2022, which is incorporated herein by reference.

TECHNICAL FIELD

The present disclosure relates to drivelines for electric or hybrid-electric vehicles including an electric motor with an insulated magnet wire and lubricating compositions in contact with the insulated magnet wire effective to provide improved durability of the insulated magnet wire.

BACKGROUND

Electric and hybrid-electric vehicles may contain a power source (a traditional combustion engine, such as a gasoline or diesel engine, and/or a battery source coupled to an electric motor) combined with a driveline and/or transmission for transferring power to the wheels of the vehicle. The driveline and/or transmission may include an electric motor and/or a gear reduction unit coupled to the wheels. In some applications, a lubricant is provided containing a lubricant composition for lubricating both the electric motor and/or gearing in the driveline or a power gear reduction unit.

In electric and hybrid-electric vehicle applications, the lubricating fluid may be in contact with wires or parts of the electric motor as well as parts of a driveline, transmission, and/or traditional combustion engine gear reduction unit. As such, suitable fluids must have applicability for very distinct types of vehicle componentry. For example, the lubricating fluid may be in contact with magnet wires found in the motor stator as well as the gears in the mechanical portions of the drivelines or transmission. Suitable fluids for these applications, therefore, not only must have traditional lubricating properties, but also need to be compatible with electronic componentry as well as insulation layers of such electronic components.

Prior lubricants for transmissions typically required low friction and anti-wear capability, stability against heat and oxidization, as well as detergency and dispersancy capabilities. In order to achieve such characteristics, prior lubricants generally included a base oil and a variety of additives such as anti-oxidants, detergents, dispersants, anti-wear agents, rust inhibitors, metal deactivators, friction modifiers, anti-foam agents, seal swell agents, and/or viscosity index improvers to suggest but a few conventional lubricant additives.

To be suitable for electric components, the fluids generally need to provide good lubricating performance, good electrical conductivity, and/or good cooling performance as well as being compatible with insulation coatings of any electrical wires or other componentry that the fluid may contact. Often, one or more of the desired properties needed for electric and hybrid-electric applications is compromised due to the collection of additives commonly used in such traditional lubricating fluids; thus, prior lubricating fluids may be unsuitable for electric or hybrid-electric vehicles for one or more reasons. For instance, some traditional lubricant packages may have low electrical conductivity but then have poor thermal conductivity (providing poor cooling performance), which would be undesired for electric or hybrid applications. Other traditional lubricant packages may have high thermal conductivity (providing good cooling capability) but then have poor electrical conductivity, which also would be undesired for the electric or hybrid applications. Yet other traditional lubricant compositions may attack or breakdown insulation provided on electrical wires or electrical components and, over time, degrade the performance of such electrical componentry as evidenced by a poor or degrading wire breakdown voltage after fluid aging. Thus, prior conventional driveline lubricating fluids do not necessarily provide desired performance for these unique applications in the context of electric or hybrid-electric drivelines.

SUMMARY

The present disclosure relates to a driveline for an electric or hybrid-electric vehicle. In one approach or embodiment, the driveline includes an electric motor including an insulated magnet wire having an insulation coating thereon with a thermal rating of about 190° C. to about 210° C. and a lubricating and cooling fluid in contact with the insulation coating of the insulated magnet wire of the electric motor. In some aspects of this embodiment, the lubricating and cooling fluid includes a detergent system providing at least about 50 ppm metal to the fluid and a base oil system including a first base oil of lubricating viscosity blended with an ester base oil. In approaches, the base oil system may also include at least about 20 weight percent of the ester base oil, and has a ratio of the metal provided by the detergent system to mol percent of ester groups in the base oil system of the lubricating and cooling fluid of about 70 or less.

In other approaches or embodiments of the driveline, the driveline may also include a number of optional embodiments in any combination. These optional approaches or embodiments of the driveline may include one or more of the following: wherein the insulation coating of the magnet wire includes one or more layers and wherein the layer in contact with the lubricating and cooling fluid includes a polyamide, a polyimide, a poly(amide/imide), combinations thereof, blends thereof, or copolymers thereof; and/or wherein the magnet wire has an AWG gauge of 14 to 30; and/or wherein the magnet wire is copper; and/or wherein the insulated magnet wire in contact with the lubricating and cooling fluid has a breakdown voltage of about 10,000 volts or higher; and/or wherein the ester base oil includes a branched diester; and/or wherein the branched diester is a reaction product of one or more dicarboxylic acids having an internal carbon chain length of 6 to 10 and one or more alcohols having a branched carbon chain length of 6 to 12 carbons; and/or wherein the ester base oil includes a monoester and/or a diester having the structure of Formula I:

(Formula I)

wherein $R_1$ is a carbon chain having m−2 carbons with m being an integer from 6 to 10, $R_2$ and $R_3$ are the same or different and include C8 to C20 linear or branched alkyl chains, and n is an integer of 0 or 1; and/or wherein n is 1 and $R_2$ and $R_3$ are the same or different and include C8 to C10 branched alkyl chains; and/or wherein the ester base oil is selected from a dibasic ester based on bi(6-methylheptyl) adipate; a dibasic ester based on bis(8-methylnonyl) adipate; or a linear monoester having about 16 to about 18 carbons in an acid moiety thereof and about 20 linear carbons in an alcohol moiety thereof; or combinations thereof; and/or wherein the detergent system includes alkali or alkaline metal salts of phenates, sulfonates, calixarates, salixrates, salicylates, carboxylic acids, sulfurized derivatives thereof, or combinations thereof; and/or wherein the alkali or alkaline metal includes calcium, magnesium, potassium, sodium, lithium, barium, or mixtures thereof; and/or wherein the detergent system provides no more than 800 ppm of the metal; and/or wherein the first base oil of the base oil system is a mineral or synthetic base oil; and/or wherein the first base oil of the base oil system is a polyalphaolefin.

In another approach or embodiment of this disclosure, the driveline for a hybrid or hybrid-electric vehicle includes an electric motor with an insulated magnet wire having an insulation coating thereon and wherein the insulation coating include a polyamide, a polyimide, a poly(amide/imide), a combination thereof, blends thereof, or copolymers thereof combined with a lubricating and cooling fluid in contact with the coating of the insulated magnet wire of the electric motor. In aspects of this embodiment, the lubricating and cooling fluid may include a detergent system providing at least about 50 ppm metal to the fluid and a base oil system including a first base oil of lubricating viscosity blended with an ester base oil and wherein the base oil system includes at least about 20 weight percent of the ester base oil.

In other approaches or embodiments of the driveline described in the previous paragraph, the driveline may also include a number of optional embodiments in any combination. These optional approaches or embodiments of the driveline may include one or more of the following: a ratio of the metal provided by the detergent system to the mol percent of ester groups in the base oil system of about 70 or less; and/or wherein the insulation coating of the magnet wire has a thermal rating of about 190° C. to about 200° C.; and/or wherein the insulated magnet wire in contact with the lubricating and cooling fluid has a breakdown voltage of about 10,000 volts or higher; and/or wherein the ester base oil includes a branched diester; and/or wherein the branched diester is a reaction product of one or more dicarboxylic acids having an internal carbon chain length of 6 to 10 and one or more alcohols having a branched carbon chain length of 6 to 12 carbons; and/or wherein the ester base oil includes a monoester and/or a diester having the structure of Formula I:

(Formula I)

wherein $R_1$ is a carbon chain having m−2 carbons with m being an integer from 6 to 10, $R_2$ and $R_3$ are the same or different and include C8 to C20 linear or branched alkyl chains, and n is an integer of 0 or 1; and/or wherein n is 1 and $R_2$ and $R_3$ are the same or different and include C8 to C10 branched alkyl chains; and/or wherein the ester base oil is selected from a dibasic ester based on bi(6-methylheptyl) adipate; a dibasic ester based on bis(8-methylnonyl) adipate; or a linear monoester having about 16 to about 18 carbons in an acid moiety thereof and about 20 linear carbons in an alcohol moiety thereof; or combinations thereof; and/or wherein the detergent system includes alkali or alkaline metal salts of phenates, sulfonates, calixarates, salixrates, salicylates, carboxylic acids, sulfurized derivatives thereof, or combinations thereof; and/or wherein the alkali or alkaline metal includes calcium, magnesium, potassium, sodium, lithium, barium, or mixtures thereof; and/or wherein the detergent system provides no more than 800 ppm of the metal.

In yet further approaches or embodiments of this disclosure, methods of lubricating a driveline and electric motor are provided. In aspects, the methods include lubricating the driveline and/or or electric motor with any embodiment of the lubricating and cooling fluids described herein wherein the insulated magnet wire of the electric motor is in contact with the lubricating an cooling fluid.

In yet other approaches or embodiments, the use of any embodiment of the lubricating and cooling fluids herein is described for lubricating any embodiment of the drivelines of a hybrid or hybrid-electric vehicle described herein. In approaches, the use includes contacting at least the insulated magnet wire of the electric motor with any embodiment of the lubricating and cooling fluids herein for achieving the improved breakdown voltage as described above.

DETAILED DESCRIPTION

The present disclosure describes systems including magnet wires with lubricating and cooling fluids suitable for electric and/or hybrid-electric vehicle applications, and in particular, drivelines and/or transmissions thereof where the lubricating and cooling fluids contact the electric and/or hybrid-electric motors and components thereof such as the insulated magnet wires. The fluids herein exhibit not only good lubricating properties, but also good electrical properties and are compatible with insulation coating layers of the magnet wires found in the electric motors of such vehicle applications.

In some aspects, the present disclosure includes a system with a driveline for an electric or hybrid-electric vehicle where the driveline includes at least an electric motor with one or more insulated magnet wires. Each magnet wire has an insulation coating thereon with a thermal rating of about 190° C. to about 210° C. In approaches, the insulation coating of the magnet wire may include one or more layers and wherein at least the outer layer in contact with the lubricating and cooling fluid includes a polyamide, a polyimide, a poly(amide/imide), combinations thereof, blends thereof, or copolymers thereof.

Figure 1:
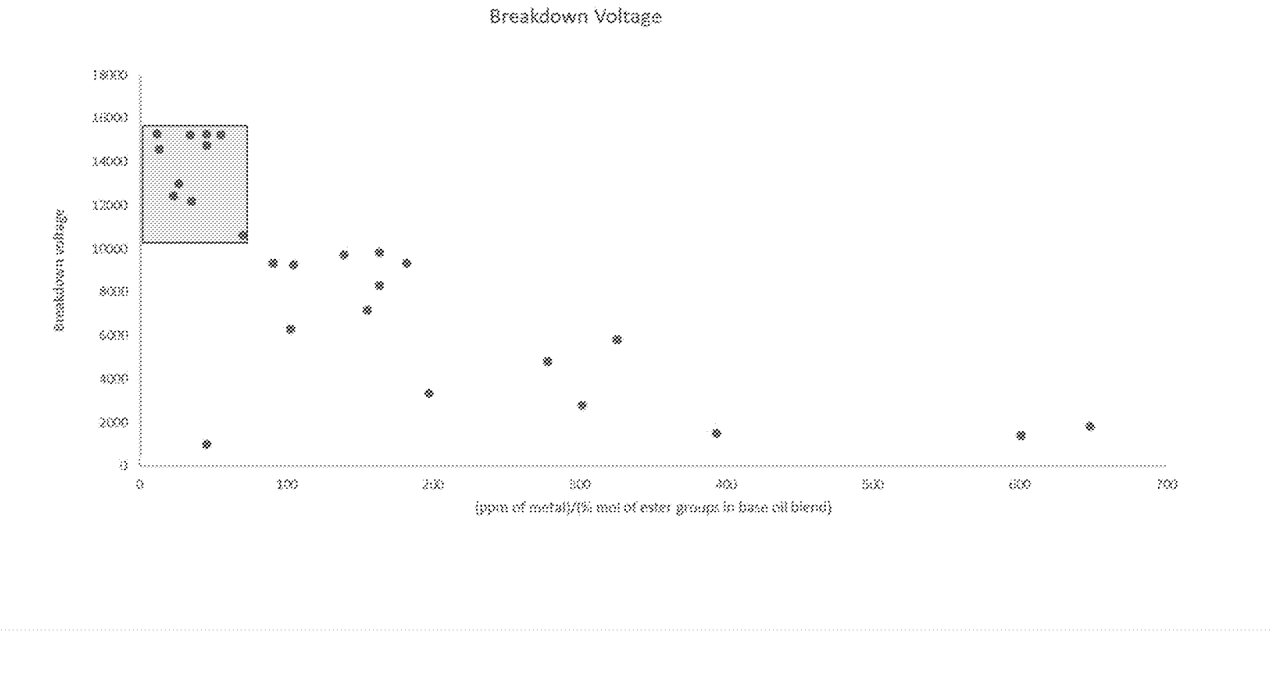
FIG. 1 is a plot of magnet wire breakdown voltage relative to metal content of a lubricating and cooling fluid and mol percent of ester groups in a base oil system of that lubricating fluid.

The driveline further includes a lubricating and cooling fluid in contact with the insulation coating of the magnet wire from the electric motor. To provide compatibility with the insulation coating of the magnet wire, the lubricating and cooling fluid includes a select composition including, but not limited to, a detergent system providing at least about 50 ppm metal to the fluid and a select base oil system including a first base oil of lubricating viscosity blended with an ester base oil. In some embodiments, the base oil system includes at least about 20 weight percent of the ester base oil, and the lubricating and cooling fluid has a ratio of metal provided by the detergent system to mol percent of ester groups in base oil system of about 70 or less. With such fluids and magnetic wire combinations, the driveline systems herein provide for the insulated magnet wire, when in contact with the lubricating and cooling fluid, to have a breakdown voltage of 10,000 volts or higher after aging (as described more below). As discussed further below and as shown in FIG. 1, lubricating and cooling fluids having such unique relationship of metal and ester content surprisingly provides good compatibility with magnet wire insulation coatings to provide the high levels of breakdown voltage and durability to the magnet wire insulation upon aging in the fluids.

Drivelines for electric and/or hybrid-electric vehicles all utilize electric motors. One feature to the electric motor is the magnet wire that is used to interchange electrical energy with magnetic energy. As generally understood, electric motors include one or more coil(s) of the magnet wire that become an electromagnet when current passes through it. The electromagnet interacts with a permanent magnet, causing the coil to spin and thereby powering the motor. As electric motors operate, they generate heat and need to be lubricated and/or cooled. Thus, fluids commonly used in internal combustion engines are often employed for similar cooling and lubricating purposes in electric motors. However, as explained in the Background, prior lubricants for internal combustion engines may not be compatible with the insulation coatings found on magnet wires as prior fluids tend to degrade the magnet wire coating upon aging as evidenced by a low measured breakdown voltage.

As used herein, breakdown voltage is measured as the Dielectric Breakdown AC Voltage specified in Sections 70 to 76 of ASTM D1676-17 using the parameters as specified therein for 6 wire twists. The wires are twisted and prepared for this evaluation pursuant to section 3.8.4 of ANSI NEMA Magnet Wire standard 1000-2018, and wire aging is performed by immersing the twisted wires in about 75 to about 100 grams of the test fluid for about 5 days (120 hours) at about 150° C. as further described below in the Examples. Water may be added to increase the severity of the testing. Breakdown voltage may be measured using a Megger 1525 insulation resistance tester or equivalent.

Magnet Wires:

The driveline systems herein include at least one electric motor and a lubricating and cooling fluid. Each electric motor includes one or more coils of magnet wires. In embodiments, the magnet wire for the electric motors and drivelines of the systems herein may be a 14 to 30 American Wire Gauge (AWG) copper or aluminum wire that is round, rectangular, or other shape covered by one or more insulation layers. The insulation layer, and in particular the outer insulation layer of the electric wire, will come into contact with the lubricating and cooling fluids of the vehicle driveline. Magnet wires often include polymer insulation layers that may include one or more distinct polymer compositions. These polymers may be blended in a single layer or such polymers may be multiple concentric layers about the wire.

In embodiments, magnet wire insulating coatings may include polymers or copolymers in single or multiple coating layers of polyvinyl alcohol-formaldehyde-polyvinyl acetate; polyurethane; polyamide; polyester; polyester-polyimide; polyamide-polyimide; and/or polyimides, or combinations thereof. Preferably, the magnet wires of the drivelines and electric motors of the systems herein include one or more coating layers of a polyamide, a polyimide, a poly(amide/imide), a polyamide-imide, or combinations thereof, blends thereof, or copolymers thereof. Insulated magnet wires have a thermal rating class, and the wires of the present disclosure typically have at least a 190° C. thermal rating and, in some instances, a 190° C. to 210° C. thermal rating, and most preferably, at 200° C. thermal rating. The outer surface of the magnet wire insulation coating contacts the lubricating and cooling fluids of the drivelines herein.

Lubricating and Cooling Fluids for the Driveline

The drivelines herein include not only the electric motors and associated magnet wires thereof as noted above, but also a lubricating and cooling fluid with a select detergent system and a select base oil system configured for magnet wire durability. These components as combined uniquely provide the magnet wires with a high durability upon aging as measured by a high breakdown voltage. Each feature of the fluid will be described in more detail below, but in general the detergent system provides at least about 50 ppm metal to the fluid (preferably at least 100 ppm metal, at least about 150 ppm metal, or at least about 200 ppm metal) and the base oil system includes a select blend of one or more first base oils of lubricating viscosity combined with an ester base oil. In some embodiments, the fluids herein may have (i) at least about 20 weight percent of the ester base oil in the base oil system and (ii) the lubricating and cooling fluid has a ratio of metal provided by the detergent system relative to the mol percent of ester groups in the base oil system of about 70 or less as generally shown in the chart of FIG. 1 to achieve the high breakdown voltage durability.

The Detergent System: The lubricant and cooling fluids herein include a unique detergent system providing select amounts of metals, such as calcium, magnesium, potassium, sodium, lithium, barium, or mixtures thereof (preferably calcium), and in some embodiments, select amounts of such metals relative to the mol percent of ester groups of the base oil systems in order to provide high breakdown voltage of the driveline magnet wires.

In embodiments, the detergent system includes detergent additives such as alkali or alkaline metal salts of phenates, sulfonates, calixarates, salixrates, salicylates, carboxylic acids, sulfurized derivatives thereof, or combinations thereof. Preferably, the detergents are phenate or sulfonates, and most preferably sulfonates. Suitable detergents and their methods of preparation are described in greater detail in numerous patent publications, including U.S. Pat. No. 7,732,390 and references cited therein, which are incorporated herein by reference. The lubricant compositions herein may include about 0.1 to about 5 weight percent of detergent additives, and in other approaches, about 0.15 to about 3 weight percent, and in yet other approaches, about 0.15 to 1.0 weight percent of detergent additives.

As noted above and in some approaches, the detergent system provides select amounts of metals, and in some approaches, select amounts of calcium and/or magnesium. For instance, the detergent system provides an amount of metal that is greater than about 50 ppm metal based on the total lubricating composition, and in other approaches, about 50 ppm to about 800 ppm metals, about 100 ppm to about 800 ppm metal, about 150 to about 800 ppm metal, or about 200 ppm to about 800 metals. In approaches, the metals are preferably calcium and/or magnesium and most preferably, calcium provided by phenates and/or sulfonates and, most preferably, overbased calcium sulfonates.

In one approach, suitable detergents in the system may include alkali or alkaline earth metal salts, e.g., calcium or magnesium, of petroleum sulfonic acids and long chain mono- or di-alkylaryl sulfonic acids with the aryl group being benzyl, tolyl, and xylyl and/or various phenates or derivatives of phenates. Examples of suitable detergents include, but are not limited to low-based/neutral and overbased variations of the following detergents: calcium phenates, calcium sulfur containing phenates, calcium sulfonates, calcium calixarates, calcium salixarates, calcium salicylates, calcium carboxylic acids, calcium phosphorus acids, calcium mono- and/or di-thiophosphoric acids, calcium alkyl phenols, calcium sulfur coupled alkyl phenol compounds, calcium methylene bridged phenols, magnesium phenates, magnesium sulfur containing phenates, magnesium sulfonates, magnesium calixarates, magnesium salixarates, magnesium salicylates, magnesium carboxylic acids, magnesium phosphorus acids, magnesium mono- and/or di-thiophosphoric acids, magnesium alkyl phenols, magnesium sulfur coupled alkyl phenol compounds, magnesium methylene bridged phenols, sodium phenates, sodium sulfur containing phenates, sodium sulfonates, sodium calixarates, sodium salixarates, sodium salicylates, sodium carboxylic acids, sodium phosphorus acids, sodium mono- and/or di-thiophosphoric acids, sodium alkyl phenols, sodium sulfur coupled alkyl phenol compounds, or sodium methylene bridged phenols.

The detergent additives may be neutral, low-based, or overbased. As understood, overbased detergent additives are well-known in the art and may be alkali or alkaline earth metal overbased detergent additives. Such detergent additives may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol.

The term "overbased" relates to metal salts, such as metal salts of sulfonates, carboxylates, salicylates and/or phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the MR is one and in an overbased salt, MR, is greater than one. They are commonly referred to as overbased, hyperbased, or superbased salts and may be salts of organic sulfur acids, carboxylic acids, or phenols.

As used herein, the term "TBN" is used to denote the Total Base Number in mg KOH/g as measured by the method of ASTM D2896. An overbased detergent of the lubricating oil composition may have a total base number (TBN) of about 200 mg KOH/gram or greater, or about 250 mg KOH/gram or greater, or about 350 mg KOH/gram or greater, or about 375 mg KOH/gram or greater, or about 400 mg KOH/gram or greater. The overbased detergent may have a metal to substrate ratio of from 1.1:1, or from 2:1, or from 4:1, or from 5:1, or from 7:1, or from 10:1.

Examples of suitable overbased detergents include, but are not limited to, overbased calcium phenates, overbased calcium sulfur containing phenates, overbased calcium sulfonates, overbased calcium calixarates, overbased calcium salixarates, overbased calcium salicylates, overbased calcium carboxylic acids, overbased calcium phosphorus acids, overbased calcium mono- and/or di-thiophosphoric acids, overbased calcium alkyl phenols, overbased calcium sulfur coupled alkyl phenol compounds, overbased calcium methylene bridged phenols, overbased magnesium phenates, overbased magnesium sulfur containing phenates, overbased magnesium sulfonates, overbased magnesium calixarates, overbased magnesium salixarates, overbased magnesium salicylates, overbased magnesium carboxylic acids, overbased magnesium phosphorus acids, overbased magnesium mono- and/or di-thiophosphoric acids, overbased magnesium alkyl phenols, overbased magnesium sulfur coupled alkyl phenol compounds, or overbased magnesium methylene bridged phenols.

When a low-based or neutral detergent is incorporated into the detergent system, it generally has a TBN of up to 175 mg KOH/g, up to 150 mg KOH/g, up to 100 mg KOH/g, or up to 50 mg KOH/g. The low-based/neutral detergent may include a calcium or magnesium-containing detergent. Examples of suitable low-based/neutral detergent include, but are not limited to, calcium sulfonates, calcium phenates, calcium salicylates, magnesium sulfonates, magnesium phenates, and/or magnesium salicylates.

In some embodiments, the detergent used in the driveline fluids herein is a neutral or low-base calcium sulfonate or phenate with a total base number of about 0 to about 100 and, in other approaches, about 0 to about 50. In other approaches, the detergent used in the driveline fluids herein is an overbased calcium sulfonate or phenate with a total base number of 150 to 400 and, in other approaches, about 200 to about 350. In yet other approaches, the detergent used in the driveline fluids herein may be a magnesium sulfonate or phenate, and when a magnesium sulfonate is incorporated into the detergent system, it can be an overbased detergent with a total base number of 300 to 500 and, in other approaches, about 350 to about 450. The above described TBN values reflect those of finished detergent components that have been diluted in a base oil.

In other embodiments, the TBN of the detergents herein may reflect a neat or non-diluted version of the detergent component. For example, the fluids herein may include neutral to low base calcium sulfonate as a neat (or non-diluted) additive having a TBN of 0 to about 80, and in other approaches, about 20 to about 80. Overbased calcium sulfonate or phenate as a neat additive may have a TBN of about 300 to about 450, and in other approaches, about 380 to about 420. Overbased magnesium sulfonate as a neat additive may have a TBN of about 500 to about 700, and in other approaches, about 600 to about 700. Preferably, the detergent systems herein include overbased calcium sulfonate detergents providing about 50 to about 800 ppm calcium.

Base Oil System: In other aspects or embodiments, the lubricating and cooling fluids of the disclosure herein includes a unique base oil system including (i) a first base oil of lubricating viscosity selected from one or more API Group I to Group V base oils blended with (ii) select amounts of ester base oils. In some embodiments, the base oil systems herein includes an API Group I, II, and/or III mineral base oil as the first base oil combined with the ester base oil. In another approach, the base oil systems herein include an API Group IV polyalphaolfin base oil as the first base oil combined with the ester base oil. In any of the above embodiments, the base oil system includes at least about 20 weight percent of the ester base oil. As discussed more below, the ester base oils of the fluids herein are a reaction product of one or more carboxylic acids or dicarboxylic acids having a specific internal carbon chain length and one or more alcohols having a specific linear or branched carbon chain length and provide a specified amount of ester functionality to the fluids. As such, when blended with the detergent systems within the noted relationships of metal to ester groups, the drivelines and electric motors herein have very high levels of magnet wire durability in context of breakdown voltage.

Ester Base Oil of the Base Oil System: One component of the lubricating and cooling fluids herein is a base oil system including at least 20 weight percent of the ester base oil. In one approach, the ester base oil of the base oil system is a linear or branched monoester and, in other approaches, a linear or branched diester of dicarboxylic acids. This ester or diester may be a reaction product of one or more carboxylic acids having an internal carbon chain length of 6 to 10 carbons and one or more alcohols having a branched carbon chain length of 6 to 12 carbons, and in other approaches, a branched carbon chain of 8 to 10 carbons, and in still yet other approaches, a branched carbon chain of 8 to 12 carbons as well as various mixtures thereof. Monoester base oils may have up to 20 carbons in the ester or alcohol groups.

Suitable ester base oils may include those obtained from the reaction of select carboxylic acid or dicarboxylic acids including sebacic acid, octanedioic acid; and/or adipic acid and the like and mixtures thereof with a variety of linear or branched alcohols including 4-methylpentanol, 3-methylpentanol, 2-methylheptanol, hexan-2-ol, 6-methylheptanol, 5-methylheptanol, 4-methylheptanol, 3-methylpentanol, 2-methylheptanol, octan-2-ol, 2-ethylhexanol, 4-ethylhexanol, 8-methylnonanol, 7-methylnonanol, 6-methylnonanol, 5-methylnonanol, 4-methylnonanol, 3-methylnonanol, 2-methylnonanol, decan2-ol, 11-methyldodecanol and the like and mixtures thereof. Specific examples of these diesters include bis(6-methylheptyl) hexanedioate, bis(8-methylnonyl) hexanedioate, bis(2-ethylhexyl) decanedioate, bis(2-ethylhexyl) hexanedioate, and the like, and combinations thereof. In one embodiment, the ester base oil is selected from diisooctyl adipate, diisodecyl adipate, icosyl palmitate, or combinations thereof. In yet other embodiments, the ester base oil is a dibasic ester based on bis(6-methylhelptyl) adipate; a dibasic ester based on bi(8-methylnonyl) adipate; or a linear monoester having about 16 to 18 carbons in an acid moiety and about 20 carbons in an alcohol moiety; or combinations thereof.

Such esters or diesters can be prepared by reacting the select carboxylic or dicarboxylic acid with the select alcohols (or mixtures thereof) as generally shown by the exemplary reaction scheme 1 below resulting in the monoester or diester of Formula (I):

(Formula I)

wherein $R_1$ includes m–2 carbons with, in some embodiments, m being an integer from 6 to 10 and $R_2$ and $R_3$ are the same or different (in Formula I) and includes a C6 to C12 branched alkyl chain, and in other approaches, a C8 to C10 branched alkyl chain, and in yet other approaches, a C8 to C12 branched alkyl chain, and in yet other approaches, a C6 to C10 branched alkyl chain, and n is an integer of 0 or 1. (Specifically, Formula I is a monoester when n is 0 and a diester when n is 1.) Preferably, the integer n is 1 and $R_2$ and $R_3$ are the same or different and include C8 to C10 branched alkyl chains. In the context of a monoester when n is 0, then $R_3$ and or $R_2$ may be up to 20 carbons, such as for instance, icosyl palmitate.

Diester base oils may have a mol percent of ester groups (—C(O)O—) of about 20 mol percent or more (such as about 20 to about 30 mol percent ester groups or about 20 to about 25 mol percent ester groups) and monoester base oils may have a mol percent of ester groups of about 8 percent or less (such as about 6 to about 8 mol percent ester groups.)

First Base Oil of the Base Oil System: the base oil systems herein may also include one or more mineral oils and/or other synthetic oils as the first base oil component. As used herein, mineral oils and other synthetic oils refers to oils categorized by the American Petroleum Institute (API) category groups Group I to V oils. Examples of natural oils include animal oils, vegetable oils (e.g. castor oil and lard oil), and mineral oils such as petroleum oils, paraffinic, or naphthenic oils. Oils derived from coal or shale are also suitable. The American Petroleum Institute has categorized these different basestock types as follows: Group I, greater than 0.03 wt percent sulfur, and/or less than 90 vol percent saturates, viscosity index between 80 and 120; Group II, less than or equal to 0.03 wt percent sulfur, and greater than or equal to 90 vol percent saturates, viscosity index between 80 and 120; Group III, less than or equal to 0.03 wt percent sulfur, and greater than or equal to 90 vol percent saturates, viscosity index greater than 120; Group IV, all polyalphaolefins. Hydrotreated basestocks and catalytically dewaxed basestocks, because of their low sulfur and aromatics content, generally fall into the Group II and Group III categories. Polyalphaolefins (Group IV basestocks) are synthetic base oils prepared from various alpha olefins and are substantially free of sulfur and aromatics. Many Group V base oils are also true synthetic products and may include diesters, polyol esters, polyalkylene glycols, alkylated aromatics, polyphosphate esters, polyvinyl ethers, and/or polyphenyl ethers, and the like.

Suitable oils may be derived from hydrocracking, hydrogenation, hydrofinishing, unrefined, refined, and re-refined oils, or mixtures thereof. Any oil blends of other base oils may be used so long as they do not detract from the desired lubricating, electrical, and thermal properties discussed above.

Unrefined oils are those derived from a natural, mineral, or synthetic source with or without little further purification treatment. Refined oils are similar to unrefined oils except that they have been treated by one or more purification steps, which may result in the improvement of one or more properties. Examples of suitable purification techniques are solvent extraction, secondary distillation, acid or base extraction, filtration, percolation, and the like. Oils refined to the quality of an edible oil may or may not be useful. Edible oils may also be called white oils. In some embodiments, lubricant compositions are free of edible or white oils.

Re-refined oils are also known as reclaimed or reprocessed oils. These are obtained in a manner similar to that used to obtain refined oils using the same or similar processes. Often these oils are additionally processed by techniques directed to removal of spent additives and oil breakdown products.

Mineral oils may include oils obtained by drilling, or from plants and animals and mixtures thereof. For example, such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully-hydrogenated, if desired. Oils derived from coal or shale may also be useful.

Useful other synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as $\alpha$-olefins, and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof.

Other synthetic lubricating oils include polyol esters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In an embodiment, oils may be prepared by a Fischer-Tropsch gas-to-liquid synthetic procedure as well as from other gas-to-liquid oils.

The first base oil component of the base oil systems herein may have a KV100 (kinematic viscosity at 100° C.) as measured per ASTM D445-18 of about 2 to about 6 cSt, about 2 to about 4 cSt, about 2 to about 3 cSt.

The base oil systems used in the lubricating and cooling fluids herein includes a blend of the first base oil and the ester base oil discussed above and, in some embodiments, includes a blend of one or more of a Group I to Group V base oils with the ester base oil. In other embodiments, the first base oil(s) are one or more oils selected from Group I to Group IV base oils, and, in yet another embodiments, the first base oil(s) are mineral base oils selected from Group I, Group II, and/or Group III or, alternatively, polyalphaolefin base oils selected from Group IV.

In some approaches, for instance, the base oil systems herein suitable for the magnet wire durability when combined with the noted detergent systems include at least about 20 weight percent of the ester base oil, and in other approaches, about 20 to about 80 weight percent of the ester base oil (based on the total weight of the base oil system), in yet other approaches, the base oil system is about 30 to about 75 weight percent ester base oil, and in yet other approaches, about 35 to about 73 weight percent ester base oil. In other approaches, or embodiments, the base oil system may include the ester base oil in amounts ranging from at least about 20 weight percent, at least about 25 weight percent, at least about 30 weight percent, at least about 35 weight percent, at least about 40 weight percent, or at least about 50 weight percent to about 80 weight percent or less, about 70 weight percent or less, about 65 weight percent or less, or about 50 weight percent or less of the total base oil system.

In some approaches, for instance, the base oil system suitable for the lubricating compositions herein includes about 20 to about 80 weight percent of a Group I, II, III, and/or IV oil as the first base oil (based on the total weight of the base oil system), in yet other approaches, the base oil system is about 60 to about 90 weight percent of the first base oil. In other approaches, or embodiments, the base oil systems may include the first base oil in amounts ranging from at least about 50 weight percent, at least about 60 weight percent, at least about 70 weight percent, at least about 75 weight percent to about 80 weight percent or less, or about 75 weight percent or less.

The finished lubricating and cooling fluids may include a major amount of the base oil system (that is the first base oil and the ester base oil) and, in some approaches, may include about 70 to about 98 weight percent of the base oil system, in other approaches, about 75 to about 90 weight percent, and in yet other approaches, about 75 to about 85 weight percent. In other approaches or embodiments, the lubricating compositions may include the base oil system in amounts ranging from at least about 70 weight percent, at least about 75 weight percent, at least about 80 weight percent, at least about 85 weight percent, or at least about 90 weight percent to about 98 weight percent or less, about 90 weight percent or less, about 85 weight percent or less, or about 80 weight percent or less.

The base oil systems herein, in some approaches or embodiments, include the blend of Group I to Group V base oils as the first base oil and the noted ester base oils may have a KV100 of about 2 to about 20 cSt, in other approaches, about 2 to about 10 cSt, about 2.5 to about 6 cSt, in yet other approaches, about 2.5 to about 3.5 cSt, and in other approaches about 2.5 to about 4.5 cSt.

Lubricating and Cooling Fluids

The lubricant and cooling fluids of the present disclosure are suitable for lubricating transmission and other components of an electric and/or hybrid-electric vehicle and include the above-described base oil system combined with one or more of the detergent additives providing the select ratios of metals to mol percent of ester groups (that is, —C(O)O— groups) in the base oil system. Suitable ratios of metals to mol percent of ester groups in the base oil system may be about 70 or less, and in other approaches, about 10 to about 70 to achieve the high breakdown voltage of the magnet wires. The lubricating oil composition may be a driveline oil, an automobile transmission fluid, an engine oil, and the like and is particularly suitable for lubricating and contacting components of electric and/or hybrid-electric vehicles including motors, generators, motor stators, and/or batteries.

In yet other approaches, the lubricating and cooling fluids may include about 30 to about 75 weight percent of the ester base oil as described herein based on the total weight of the lubricating and cooling fluids. In other approaches, the lubricating and cooling fluids may include an amount of the ester base oil herein ranging from at least about 30 weight percent, at least about 40 weight percent, at least about 50 weight percent, at least about 60 weight percent, at least about 65 weight percent, at least about 70 weight percent to less than about 80 weight percent, less than about 75 weight percent, less than about 70 weight percent, less than about 60 weight percent, less than about 50 weight percent, or less than about 40 weight percent.

In further approaches, the lubricating oil compositions may also include about 40 to about 80 weight percent of the one or more mineral or other synthetic (PAO) oil as the first base oil based on the total weight of the lubricating cooling fluids. The first base oil may include at least one or more Group I to Group V oils as discussed above as long as the lubricating compositions still achieve the desired characteristics as discussed throughout this disclosure.

As used herein, the terms "oil composition," "lubrication composition," "lubricating oil composition," "lubricating oil," "lubricant composition," "fully formulated lubricant composition," "lubricant," and "lubricating and cooling fluid" are considered synonymous, fully interchangeable terminology referring to the finished lubrication product comprising a major amount of a base oil component plus minor amounts of the detergents and the other optional components.

The lubricants herein may also include other optional additives as needed for particular applications so long as such additives do not detract from the electrical and cooling properties as discussed herein. Several common optional additives are noted below:

Optional Additive Components

In addition to the base oils as described above, the lubricating oil compositions herein may also include other additives to perform one or more functions required of a lubricating fluid. Further, one or more of the mentioned additives may be multi-functional and provide other functions in addition to or other than the function prescribed herein.

For example, the compositions herein may include one or more of at least one component selected from the group consisting of a friction modifier, an air expulsion additive, an antioxidant, a corrosion inhibitor, a foam inhibitor, a seal-swell agent, a viscosity index improver, anti-rust agent, extreme pressure additives, and combinations thereof. Other performance additives may also include, in addition to those specified above, one or more of metal deactivators, ashless TBN boosters, demulsifiers, emulsifiers, pour point depressants, and mixtures thereof. Typically, fully-formulated lubricating oils will contain one or more of these performance additives. Examples of some common optional additive components are set forth below.

Viscosity Index Improvers:

In addition to the poly(meth)acrylate copolymer described above, the lubricating oil compositions herein also may optionally contain one or more additional or supplemental viscosity index improvers. Suitable supplemental viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, poly(meth)acrylates, polyacrylates, polyalkyl styrenes, hydrogenated alkenyl aryl conjugated diene copolymers, or mixtures thereof. Viscosity index improvers may include star polymers, comb polymers, and suitable examples may be described in US Publication No. 2012/0101017 A1.

The lubricating oil compositions herein also may optionally contain one or more dispersant viscosity index improvers in addition to the PMA viscosity index improver discussed above. Suitable dispersant viscosity index improvers may include functionalized polyolefins, for example, ethylene-propylene copolymers that have been functionalized with the reaction product of an acylating agent (such as maleic anhydride) and an amine; poly(meth)acrylates functionalized with an amine, or esterified maleic anhydride-styrene copolymers reacted with an amine.

The total amount of viscosity index improver and/or dispersant viscosity index improver may be 0 wt. % to 20 wt. %, 0.1 wt. % to 15 wt. %, 0.25 wt. % to 12 wt. %, or 0.5 wt. % to 10 wt. %, of the lubricating composition.

Dispersants

The lubricant composition may include one or more select dispersants or mixtures thereof. Dispersants are often known as ashless-type dispersants because, prior to mixing in a lubricating oil composition, they do not contain ash-forming metals and they do not normally contribute any ash when added to a lubricant. Ashless-type dispersants are characterized by a polar group attached to a relatively high molecular or weight hydrocarbon chain. Typical ashless dispersants include N-substituted long chain alkenyl succinimides. N-substituted long chain alkenyl succinimides include polyisobutylene (PIB) substituents with a number average molecular weight of the polyisobutylene substituent in a range of about 800 to about 2500 as determined by gel permeation chromatograph (GPC) using polystyrene (with a number average molecular weight of 180 to about 18,000) as the calibration reference. The PIB substituent used in the dispersant typically has a viscosity at 100° C. of about 2100 to about 2700 cSt as determined using ASTM D445-18. Succinimide dispersants and their preparation are disclosed, for instance in U.S. Pat. Nos. 7,897,696 and 4,234,435 which are incorporated herein by reference. Succinimide dispersants are typically an imide formed from a polyamine, typically a poly(ethyleneamine). The dispersants may include two succinimide moieties joined by a polyamine. The polyamine may be tetra ethylene penta amine (TEPA), tri ethylene tetra amine (TETA), penta ethylene hexa amine (PEHA), other higher nitrogen ethylene diamine species and/or mixtures thereof. The polyamines may be mixtures of linear, branched and cyclic amines. The PIB substituents may be joined to each succinimide moiety.

In some embodiments the lubricant composition comprises at least one polyisobutylene succinimide dispersant derived from polyisobutylene with number average molecular weight in the range about 350 to about 5000, or about 500 to about 3000, as measured by the GPC method described above. The polyisobutylene succinimide may be used alone or in combination with other dispersants.

In some embodiments, polyisobutylene (PIB), when included, may have greater than 50 mol. %, greater than 60 mol. %, greater than 70 mol. %, greater than 80 mol. %, or greater than 90 mol. % content of terminal double bonds. Such a PIB is also referred to as highly reactive PIB ("HR-PIB"). HR-PIB having a number average molecular weight ranging from about 800 to about 5000 is suitable for use in embodiments of the present disclosure. Conventional non-highly reactive PIB typically has less than 50 mol. %, less than 40 mol. %, less than 30 mol. %, less than 20 mol. %, or less than 10 mol. % content of terminal double bonds.

An HR-PIB having a number average molecular weight ranging from about 900 to about 3000, as measured by the GPC method described above, may be suitable. Such an HR-PIB is commercially available, or can be synthesized by the polymerization of isobutene in the presence of a non-chlorinated catalyst such as boron trifluoride, as described in U.S. Pat. Nos. 4,152,499 and 5,739,355. When used in the aforementioned thermal ene reaction, HR-PIB may lead to higher conversion rates in the reaction, as well as lower amounts of sediment formation, due to increased reactivity.

In some embodiments the lubricant composition comprises at least one dispersant derived from polyisobutylene succinic anhydride. In an embodiment, the dispersant may be derived from a polyalphaolefin (PAO) succinic anhydride. In an embodiment, the dispersant may be derived from olefin maleic anhydride copolymer. As an example, the dispersant may be described as a poly-PIBSA. In an embodiment, the dispersant may be derived from an anhydride which is grafted to an ethylene-propylene copolymer.

One class of suitable dispersants may be Mannich bases. Mannich bases are materials that are formed by the condensation of a higher molecular weight, alkyl substituted phenol, a polyalkylene polyamine, and an aldehyde such as formaldehyde. Mannich bases are described in more detail in U.S. Pat. No. 3,634,515.

A suitable class of dispersants may be high molecular weight esters or half ester amides.

The dispersants may also be post-treated by conventional methods by reaction with any of a variety of agents. Among these agents are boron, urea, thiourea, dimercaptothiadiazoles, carbon disulfide, aldehydes, ketones, carboxylic acids, hydrocarbon-substituted succinic anhydrides, maleic anhydride, nitriles, epoxides, carbonates, cyclic carbonates, hindered phenolic esters, and phosphorus compounds. U.S. Pat. Nos. 7,645,726; 7,214,649; and 8,048,831 describes some suitable post-treatment methods and post-treated products.

Suitable boron compounds useful in forming the dispersants herein include any boron compound or mixtures of boron compounds capable of introducing boron-containing species into the ashless dispersant. Any boron compound, organic or inorganic, capable of undergoing such reaction can be used. Accordingly, use can be made of boron oxide, boron oxide hydrate, boron trifluoride, boron tribromide, boron trichloride, $HBF_4$ boron acids such as boronic acid (e.g. alkyl-$B(OH)_2$ or aryl-$B(OH)_2$), boric acid, (i.e., $H_3BO_3$), tetraboric acid (i.e., $H_2B_5O_7$), metaboric acid (i.e., $HBO_2$), ammonium salts of such boron acids, and esters of such boron acids. The use of complexes of a boron trihalide with ethers, organic acids, inorganic acids, or hydrocarbons is a convenient means of introducing the boron reactant into the reaction mixture. Such complexes are known and are exemplified by boron trifluoride-diethyl ether, boron trifluoride-phenol, boron trifluoride-phosphoric acid, boron trichloride-chloroacetic acid, boron tribromide-dioxane, and boron trifluoride-methyl ethyl ether.

Suitable phosphorus compounds for forming the dispersants herein include phosphorus compounds or mixtures of phosphorus compounds capable of introducing a phosphorus-containing species into the ashless dispersant. Any phosphorus compound, organic or inorganic, capable of undergoing such reaction can thus be used. Accordingly, use can be made of such inorganic phosphorus compounds as the inorganic phosphorus acids, and the inorganic phosphorus oxides, including their hydrates. Typical organic phosphorus compounds include full and partial esters of phosphorus acids, such as the mono-, di-, and tri esters of phosphoric acid, thiophosphoric acid, dithiophosphoric acid, trithiophosphoric acid and tetrathiophosphoric acid; the mono-, di-, and tri esters of phosphorous acid, thiophosphorous acid, dithiophosphorous acid and trithiophosphorous acid; the trihydrocarbyl phosphine oxides: the trihydrocarbyl phosphine sulfides; the mono- and dihydrocarbyl phosphonates, (RPO(OR')(OR") where R and R are hydrocarbyl and R" is a hydrogen atom or a hydrocarbyl group), and their mono-, di- and trithio analogs; the mono- and dihydrocarbyl phosphonites, (RP(OR')(OR") where R and R' are hydrocarbyl and R" is a hydrogen atom or a hydrocarbyl group) and their mono- and dithio analogs: and the like. Thus, use can be made of such compounds as, for example, phosphorous acid ($H_3PO_3$, sometimes depicted as $H_2(HPO_3)$, and sometimes called ortho-phosphorous acid or phosphonic acid), phosphoric acid ($H_3PO_4$, sometimes called orthophosphoric acid), hypophosphoric acid ($H_4P_2O_6$), metaphosphoric acid ($HPO_3$), pyrophosphoric acid ($H_4P_2O_7$), hypophosphorous acid ($H_3PO_2$, sometimes called phosphinic acid), pyrophosphorous acid ($H_4P_2O_5$, sometimes called pyrophosphonic acid), phosphinous acid ($H_3PO$), tripolyphosphoric acid ($H_5P_3O_{10}$), tetrapolyphosphoric acid ($H_5P_4O_{13}$), trimetaphosphoric acid ($H_3P_3O_9$), phosphorus trioxide, phosphorus tetraoxide, phosphorus pentoxide, and the like. Partial or total sulfur analogs such as phosphorotetrathioic acid ($H_3PS_4$), phosphoromonothioic acid ($H_3PO_3S$), phosphorodithioic acid ($H_3PO_2S_2$), phosphorotrithioic acid ($H_3POS_3$), phosphorus sesquisulfide, phosphorus heptasulfide, and phosphorus pentasulfide ($P_2S_5$, sometimes referred to as $P_4S_{10}$) can also be used in forming dispersants for this disclosure. Also usable are the inorganic phosphorus halide compounds such as $PCl_3$, $PBr_3$, $POCl_3$, $PSCl_3$, etc.

Likewise use can be made of such organic phosphorus compounds as mono-, di-, and triesters of phosphoric acid (e.g., trihydrocarbyl phosphates, dihydrocarbyl monoacid phosphates, monohydrocarbyl diacid phosphates, and mixtures thereof), mono-, di-, and triesters of phosphorous acid (e.g., trihydrocarbyl phosphites, dihydrocarbyl hydrogen phosphites, hydrocarbyl diacid phosphites, and mixtures thereof), esters of phosphonic acids (both "primary", RP(O)(OR)$_2$, and "secondary" $R_3P(O)(OR)$), esters of phosphinic acids, phosphonyl halides (e.g., $RP(O)Cl_2$ and $R_2P(O)Cl$), halophosphites (e.g., $(RO)PCl_2$ and $(RO)_2PCl$), halophosphates (e.g., $ROP(O)Cl_2$ and $(RO)_2P(O)Cl$), tertiary pyrophosphate esters (e.g., $(RO)_2P(O)$—O—$P(O)(OR)_2$), and the total or partial sulfur analogs of any of the foregoing organic phosphorus compounds, and the like wherein each hydrocarbyl group contains up to about 100 carbon atoms, or up to about 50 carbon atoms, or up to about 24 carbon atoms, or up to about 12 carbon atoms. Also usable are the halophosphine halides (e.g., hydrocarbyl phosphorus tetrahalides, dihydrocarbyl phosphorus trihalides, and trihydrocarbyl phosphorus dihalides), and the halophosphines (monohalophosphines and dihalophosphines).

The lubricants herein may include mixtures of one or more boronated and phosphorylated dispersants set forth above combined with non-boronated and non-phosphorylated dispersants.

In one embodiment the lubricating oil composition may include at least one borated dispersant, wherein the dispersant is the reaction product of an olefin copolymer or a reaction product of an olefin copolymer with succinic anhydride, and at least one polyamine. The ratio of PIBSA: polyamine may be from 1:1 to 10:1, or 1:1 to 5:1, or 4:3 to 3:1, or 4:3 to 2:1. A particularly useful dispersant contains a polyisobutenyl group of the PIBSA having a number average molecular weight (Mn) in the range of from about 500 to 5000, as determined by the GPC method described above, and a (B) polyamine having a general formula $H_2N(CH_2)_m$—$[NH(CH_2)_m]_n$—$NH_2$, wherein m is in the range from 2 to 4 and n is in the range of from 1 to 2.

In addition to the above, the dispersant may be post-treated with an aromatic carboxylic acid, an aromatic polycarboxylic acid, or an aromatic anhydride wherein all carboxylic acid or anhydride group(s) are attached directly to an aromatic ring. Such carboxyl-containing aromatic compounds may be selected from 1,8-naphthalic acid or anhydride and 1,2-naphthalenedicarboxylic acid or anhydride, 2,3-naphthalenedicarboxylic acid or anhydride, naphthalene-1,4-dicarboxylic acid, naphthalene-2,6-dicarboxylic acid, phthalic anhydride, pyromellitic anhydride, 1,2,4-benzene tricarboxylic acid anhydride, diphenic acid or anhydride, 2,3-pyridine dicarboxylic acid or anhydride, 3,4-pyridine dicarboxylic acid or anhydride, 1,4,5,8-naphthalenetetracarboxylic acid or anhydride, perylene-3,4,9,10-tetracarboxylic anhydride, pyrene dicarboxylic acid or anhydride, and the like. The moles of this post-treatment component reacted per mole of the polyamine may range from about 0.1:1 to about 2:1. A typical molar ratio of this post-treatment component to polyamine in the reaction mixture may range from about 0.2:1 to about 2:1. Another molar ratio of this post-treatment component to the polyamine that may be used may range from 0.25:1 to about 1.5:1. This post-treatment component may be reacted with the other components at a temperature ranging from about 140° to about 180° C.

Alternatively, or in addition to the post-treatment described above, the dispersant may be post-treated with a non-aromatic dicarboxylic acid or anhydride. The non-aromatic dicarboxylic acid or anhydride of may have a number average molecular weight of less than 500, as measured by the GPC method described above. Suitable carboxylic acids or anhydrides thereof may include, but are not limited to acetic acid or anhydride, oxalic acid and anhydride, malonic acid and anhydride, succinic acid and anhydride, alkenyl succinic acid and anhydride, glutaric acid and anhydride, adipic acid and anhydride, pimelic acid and anhydride, suberic acid and anhydride, azelaic acid and anhydride, sebacic acid and anhydride, maleic acid and anhydride, fumaric acid and anhydride, tartaric acid and anhydride, glycolic acid and anhydride, 1,2,3,6-tetrahydronaphthalic acid and anhydride, and the like.

The non-aromatic carboxylic acid or anhydride is reacted at a molar ratio with the polyamine ranging from about 0.1 to about 2.5 moles per mole of polyamine. Typically, the amount of non-aromatic carboxylic acid or anhydride used will be relative to the number of secondary amino groups in the polyamine. Accordingly, from about 0.2 to about 2.0 moles of the non-aromatic carboxylic acid or anhydride per secondary amino group in Component B may be reacted with the other components to provide the dispersant according to embodiments of the disclosure. Another molar ratio of the non-aromatic carboxylic acid or anhydride to polyamine that may be used may range from 0.25:1 to about 1.5:1 moles of per mole of polyamine. The non-aromatic carboxylic acid or anhydride may be reacted with the other components at a temperature ranging from about 140° to about 180° C.

The weight % actives of the alkenyl or alkyl succinic anhydride can be determined using a chromatographic technique. This method is described in column 5 and 6 in U.S. Pat. No. 5,334,321. The percent conversion of the polyolefin is calculated from the % actives using the equation in column 5 and 6 in U.S. Pat. No. 5,334,321.

The TBN of a suitable borated dispersant may be from about 10 to about 65 mg KOH/gram composition on an oil-free basis, which is comparable to about 5 to about 30 mg KOH/gram composition TBN if measured on a dispersant sample containing about 50% diluent oil.

Typically, the dispersants described above are provided in about 4.5 to about 25 weight percent and, in other approaches, about 4.5 to about 12 weight percent, and in yet other approaches, about 4.5 to about 7.7 weight percent in the lubricant.

Extreme Pressure Agents

The lubricating oil compositions herein may also optionally contain one or more extreme pressure agents. Extreme Pressure (EP) agents that are soluble in the oil include sulfur- and chlorosulfur-containing EP agents, chlorinated hydrocarbon EP agents and phosphorus EP agents. Examples of such EP agents include chlorinated wax; organic sulfides and polysulfides such as dibenzyldisulfide, bis(chlorobenzyl) disulfide, dibutyl tetrasulfide, sulfurized methyl ester of oleic acid, sulfurized alkylphenol, sulfurized dipentene, sulfurized terpene, and sulfurized Diels-Alder adducts; phosphosulfurized hydrocarbons such as the reaction product of phosphorus sulfide with turpentine or methyl oleate; phosphorus esters such as the dihydrocarbyl and trihydrocarbyl phosphites, e.g., dibutyl phosphite, diheptyl phosphite, dicyclohexyl phosphite, pentylphenyl phosphite; dipentylphenyl phosphite, tridecyl phosphite, distearyl phosphite and polypropylene substituted phenyl phosphite; metal thiocarbamates such as zinc dioctyldithiocarbamate and barium heptylphenol diacid; amine salts of alkyl and dialkylphosphoric acids, including, for example, the amine salt of the reaction product of a dialkyldithiophosphoric acid with propylene oxide; and mixtures thereof.

The extreme pressure agents may be present in amount of, for example, from 0 to 3.0 wt. % or from 0.1 to 2.0 wt. %, based on the total weight of the lubricating oil composition.

Anti-Wear Agents: The lubricating oil compositions herein also may optionally contain one or more anti-wear agents. Examples of suitable antiwear agents include, but are not limited to, a metal thiophosphate; a metal dialkyldithiophosphate; a phosphoric acid ester or salt thereof; a phosphate ester(s); a phosphite; a phosphorus-containing carboxylic ester, ether, or amide; a sulfurized olefin; thiocarbamate-containing compounds including, thiocarbamate esters, alkylene-coupled thiocarbamates, and bis(S-alkyldithiocarbamyl) disulfides; and mixtures thereof. A suitable antiwear agent may be a molybdenum dithiocarbamate. The phosphorus containing antiwear agents are more fully described in European Patent 612 839. The metal in the dialkyl dithio phosphate salts may be an alkali metal, alkaline earth metal, aluminum, lead, tin, molybdenum, manganese, nickel, copper, titanium, or zinc. A useful antiwear agent may be zinc dialkyldithiophosphate.

Further examples of suitable antiwear agents include titanium compounds, tartrates, tartrimides, oil soluble amine salts of phosphorus compounds, sulfurized olefins, phosphites (such as dibutyl phosphite), phosphonates, thiocarbamate-containing compounds, such as thiocarbamate esters, thiocarbamate amides, thiocarbamic ethers, alkylene-coupled thiocarbamates, and bis(S-alkyldithiocarbamyl) disulfides. The tartrate or tartrimide may contain alkyl-ester groups, where the sum of carbon atoms on the alkyl groups may be at least 8. The antiwear agent may in one embodiment include a citrate.

The antiwear agent may be present in ranges including about 0 wt % to about 15 wt %, in other approaches, about 0.01 wt % to about 10 wt %, in yet other approaches, about 0.05 wt % to about 5 wt %, or, in further approaches, about 0.1 wt % to about 3 wt % of the lubricating oil composition.

Friction Modifiers

The lubricating oil compositions herein may also optionally contain one or more friction modifiers. Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanidine, alkanolamides, phosphonates, metal-containing compounds, glycerol esters, sulfurized fatty compounds and olefins, sunflower oil other naturally occurring plant or animal oils, dicarboxylic acid esters, esters or partial esters of a polyol and one or more aliphatic or aromatic carboxylic acids, and the like.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from 12 to 25 carbon atoms. In some embodiments the friction modifier may be a long chain fatty acid ester. In another embodiment the long chain fatty acid ester may be a mono-ester, or a di-ester, or a (tri)glyceride. The friction modifier may be a long chain fatty amide, a long chain fatty ester, a long chain fatty epoxide derivatives, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685.

Aminic friction modifiers may include amines or polyamines. Such compounds can have hydrocarbyl groups that are linear, either saturated or unsaturated, or a mixture thereof and may contain from 12 to 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291.

A friction modifier may optionally be present in ranges such as 0 wt. % to 6 wt. %, or 0.01 wt. % to 4 wt. %, or 0.05 wt. % to 2 wt. %.

Detergents

The lubricant composition also includes one or more select detergents or mixtures thereof to provide specific amounts of metal and soap content to the lubricating composition. By one approach, the detergent is a metal containing detergent, such as neutral to overbased detergents. Suitable detergent substrates include phenates, sulfur containing phenates, sulfonates, calixarates, salixarates, salicylates, carboxylic acids, phosphorus acids, mono- and/or di-thiophosphoric acids, alkyl phenols, sulfur coupled alkyl phenol compounds and methylene bridged phenols. Suitable detergents and their methods of preparation are described in greater detail in numerous patent publications, including U.S. Pat. No. 7,732,390, and references cited therein. In one approach, the detergents are neutral to overbased sulfonates, phenates, or carboxylates with an alkali metal or alkaline earth metal salt. The detergents may be linear or branched, such as linear or branched sulfonates. Linear detergents are those that include a straight chain with no side chains attached thereto and typically include carbon atoms bonded only to one or two other carbon atoms. Branched detergents are those with one or more side chains attached to the molecule's backbone and may include carbon atoms bonded to one, two, three, or four other carbon atoms. In one embodiment the sulfonate detergent may be a predominantly linear alkylbenzenesulfonate detergent. In some embodiments the linear alkyl (or hydrocarbyl) group may be attached to the benzene ring anywhere along the linear chain of the alkyl group, but often in the 2, 3, or 4 position of the linear chain, and in some instances predominantly in the 2 position. In other embodiments, the alkyl (or hydrocarbyl) group may be branched, that is, formed from a branched olefin such as propylene or 1-butene or isobutene. Sulfonate detergents having a mixture of linear and branched alkyl groups may also be used.

The detergent substrate may be salted with an alkali or alkaline earth metal such as, but not limited to, calcium, magnesium, potassium, sodium, lithium, barium, or mixtures thereof. In some embodiments, the detergent is free of barium. A suitable detergent may include alkali or alkaline earth metal salts of petroleum sulfonic acids and long chain mono- or di-alkylarylsulfonic acids with the aryl group being one of benzyl, tolyl, and xylyl.

Overbased detergent additives are well known in the art and may be alkali or alkaline earth metal overbased detergent additives. Such detergent additives may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol. In general, the terminology "overbased" relates to metal salts, such as metal salts of sulfonates, carboxylates, and phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, the MR, is greater than one. Such salts are commonly referred to as overbased, hyperbased, or superbased salts and may be salts of organic sulfur acids, carboxylic acids, or phenols. The detergents may also exhibit a total base number (TBN) of about 27 to about 400 and, in other approaches, about 200 to about 400.

In transmission fluids, the detergent provides less than about 455 ppm of the metal to the lubricant composition. Higher levels of metal result in failures in one or more of the friction durability or wear tests set forth herein. In other approaches, the detergent provides about 0 to about 281 ppm of metal. In yet other approaches, the detergent provides about 0 to about 100 ppm metal to the lubricant composition.

The detergent also provides select levels of soap content to the lubricant composition and the provided soap amounts are balanced with the level of metal such that if the metal is not within the desired ranges, then increasing soap content does not achieve desired results, which is discussed in more detail in the Examples herein. By one approach, the detergent provides about 0.02 to about 0.15 percent soap content to the final lubricating composition, such as sulfonate soap, phenate soap, and/or carboxylate soap. In other approaches, the detergent provides about 0.02 to about 0.1 percent soap, and in yet other approaches, about 0.02 to about 0.05 percent soap.

Soap content generally refers to the amount of neutral organic acid salt and reflects a detergent's cleansing ability, or detergency, and dirt suspending ability. The soap content can be determined by the following formula, using an exemplary calcium sulfonate detergent (represented by $RSO_3)_v Ca_w(CO_3)_x(Oh)_y$ with v, w, x, and y denoting the number of sulfonate groups, the number of calcium atoms, the number of carbonate groups, and the number of hydroxyl groups respectively):

$$\text{soap cotent} = \frac{\text{formula weight of } [(RSO_3)_2 Ca]}{\text{effective formula weight}} \times 100$$

Effective formula weight is the combined weight of all the atoms that make up the formula $(RSO_3)_v Ca_w(CO_3)_x(OH)_y$, plus that of any other lubricant components. Further discussion on determining soap content can be found in FUELS AND LUBRICANTS HANDBOOK, TECHNOLOGY, PROPERTIES, PERFORMANCE, AND TESTING, George Totten, editor, ASTM International, 2003, relevant portions thereof incorporated herein by reference.

In some approaches, the metal containing detergent is not boronated such that the boron in the lubricant is solely provided by the dispersant.

The total amount of detergent that may be present in the lubricating oil composition may be from 0 wt. % to 2 wt. %, or from about 0 wt. % to about 0.5 wt. %, or about 0 wt. % to about 0.15 wt.

Antioxidants

The lubricating oil compositions herein also may optionally contain one or more antioxidants. Antioxidant compounds are known and include for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidant compounds may be used alone or in combination.

Useful antioxidants may include diarylamines and high molecular weight phenols. In an embodiment, the lubricating oil composition may contain a mixture of a diarylamine and a high molecular weight phenol, such that each antioxidant may be present in an amount sufficient to provide up to about 5%, by weight, based upon the final weight of the lubricating oil composition. In an embodiment, the antioxidant may be a mixture of 0.3 to 2% diarylamine and 0.4 to 2% high molecular weight phenol, by weight, based upon the final weight of the lubricating oil composition.

The one or more antioxidant(s) may be present in ranges 0 wt. % to 5 wt. %, or 0.01 wt. % to 5 wt. %, or 0.1 wt. % to 3 wt. %, or 0.8 wt. % to 2 wt. %, of the lubricating composition.

Corrosion Inhibitors

The automatic transmission lubricants may further include additional corrosion inhibitors (it should be noted that some of the other mentioned components may also have copper corrosion inhibition properties). Suitable additional inhibitors of copper corrosion include ether amines, polyethoxylated compounds such as ethoxylated amines and ethoxylated alcohols, imidazolines, monoalkyl and dialkyl thiadiazole, and the like.

Thiazoles, triazoles and thiadiazoles may also be used in the lubricants. Examples include benzotriazole; tolyltriazole; octyltriazole; decyltriazole; dodecyltriazole; 2-mercaptobenzothiazole; 2,5-dimercapto-1,3,4-thiadiazole; 2-mercapto-5-hydrocarbylthio-1,3,4-thiadiazoles; and 2-mercapto-5-hydrocarbyldithio-1,3,4-thiadiazoles. In one embodiment, the thiadiazoles are 1,3,4-thiadiazoles. In another embodiment, the thiadiazoles are 2-hydrocarbyldithio-5-mercapto-1,3,4-dithiadiazoles. A number of the thiadiazoles are available as articles of commerce.

The corrosion inhibitor, if present, can be used in an amount sufficient to provide 0 wt. % to 5 wt. %, 0.01 wt. % to t 3 wt. %, 0.1 wt. % to 2 wt. %, based upon the final weight of the lubricating oil composition.

Foam Inhibitors/Anti Foam Agents

Anti-foam/Surfactant agents may also be included in a fluid according to the present disclosure. Various agents are known for such use. In one embodiment, the agents are copolymers of ethyl acrylate and hexyl ethyl acrylate, such as PC-1244, available from Solutia. In another embodiment, the agents are silicone fluids, such as 4% DCF. In another embodiment, the agents are mixtures of anti-foam agents.

Anti-Rust Agents

Various known anti-rust agents or additives are known for use in transmission fluids, and are suitable for use in the fluids according to the present disclosure. The anti-rust agents include alkyl polyoxyalkylene ethers, such as Mazawet® 77, C-8 acids such as Neofat® 8, oxyalkyl amines such as Tomah PA-14, 3-decyloxypropylamine, and polyoxypropylene-polyoxyethylene block copolymers such as Pluronic® L-81.

Pour Point Depressants

Suitable pour point depressants may include polymethylmethacrylates or mixtures thereof. Pour point depressants may be present in an amount sufficient to provide from 0 wt. % to 1 wt. %, 0.01 wt. % to 0.5 wt. %, or 0.02 wt. % to 0.04 wt. %, based upon the total weight of the lubricating composition.

Seal-Swell Agents

The automatic transmission fluids of the present disclosure may further include seal swell agents. Seal swell agents such as esters, adipates, sebacates, azealates, phthalates, sulfones, alcohols, alkylbenzenes, substituted sulfolanes, aromatics, or mineral oils cause swelling of elastomeric materials used as seals in engines and automatic transmissions.

Alcohol-type seal swell agents are generally low volatility linear alkyl alcohols, such as decyl alcohol, tridecyl alcohol and tetradecyl alcohol. Alkylbenzenes useful as seal swell agents include dodecylbenzenes, tetradecylbenzenes, dinonyl-benzenes, di(2-ethylhexyl)benzene, and the like. Substituted sulfolanes (e.g. those described in U.S. Pat. No. 4,029,588, incorporated herein by reference) are likewise useful as seal swell agents in compositions according to the present disclosure. Mineral oils useful as seal swell agents in the present disclosure include low viscosity mineral oils with high naphthenic or aromatic content. Aromatic seal swell agents include the commercially available Exxon Aromatic 200 ND seal swell agent. Commercially available examples of mineral oil seal swell agents include Exxon® Necton®-37 (FN 1380) and Exxon® Mineral Seal Oil (FN 3200).

Based on the above discussion, exemplary ranges of various lubricating composition components are set forth in Table 1 below.

TABLE 1

Lubricant Composition for Electric and/or Hybrid-Electric applications

| Component | Suitable Ranges, Weight Percent | Preferred Ranges, Weight Percent |
|---|---|---|
| Ester base oil | 20 to 80 | 30 to 80 |
| Dispersants | 4.5 to 25 | 2.0 to 12 |
| Detergents | 0 to 2 | 0 to 1.0 |
| Friction Modifiers | 0 to 6 | 0.01 to 4 |
| Other Viscosity Index Improvers | 0 to 20 | 0 to 15 |
| Antioxidants | 0 to 5 | 0.01 to 3 |
| Rust inhibitors | 0 to 1 | 0.005 to 0.5 |
| Corrosion Inhibitors | 0 to 2 | 0.1 to 2 |
| Anti-wear agents | 0 to 15 | 0 to 3 |
| Seal Swell Agents | 0 to 20 | 0 to 10 |

TABLE 1-continued

Lubricant Composition for Electric and/or Hybrid-Electric applications

| Component | Suitable Ranges, Weight Percent | Preferred Ranges, Weight Percent |
|---|---|---|
| Antifoam Agents | 0 to 1 | 0.005 to 0.8 |
| Extreme pressure agents | 0 to 3 | 0 to 2 |
| First Base Oil(s) | 40 to 80 | 50 to 80 |
| Total | 100 | 100 |

The percentages of each component above represent the weight percent of each component, based upon the weight of the total final lubricating oil composition. The balance of the lubricating oil composition consists of one or more base oils as defined hereinabove. Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent).

Definitions

For purposes of this disclosure, the chemical elements are identified in accordance with the Periodic Table of the Elements, CAS version, Handbook of Chemistry and Physics, 75th Ed. Additionally, general principles of organic chemistry are described in "Organic Chemistry", Thomas Sorrell, University Science Books, Sausolito: 1999, and "March's Advanced Organic Chemistry", 5th Ed., Ed.: Smith, M. B. and March, J., John Wiley & Sons, New York: 2001, the entire contents of which are hereby incorporated by reference.

As described herein, compounds may optionally be substituted with one or more substituents, such as are illustrated generally above, or as exemplified by particular classes, subclasses, and species of the disclosure.

Unless otherwise apparent from the context, the term "major amount" is understood to mean an amount greater than or equal to 50 weight percent, for example, from about 80 to about 98 weight percent relative to the total weight of the composition. Moreover, as used herein, the term "minor amount" is understood to mean an amount less than 50 weight percent relative to the total weight of the composition.

As used herein, the term "hydrocarbyl group" or "hydrocarbyl" is used in its ordinary sense, which is well-known to those skilled in the art. Specifically, it refers to a group having a carbon atom directly attached to the remainder of a molecule and having a predominantly hydrocarbon character. Examples of hydrocarbyl groups include: (1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical); (2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, amino, alkylamino, and sulfoxy); (3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl, and imidazolyl. In general, no more than two, or as a further example, no more than one, non-hydrocarbon substituent will be present for every ten carbon atoms in the hydrocarbyl group; in some embodiments, there will be no non-hydrocarbon substituent in the hydrocarbyl group.

As used herein the term "aliphatic" encompasses the terms alkyl, alkenyl, alkynyl, each of which being optionally substituted as set forth below.

As used herein, an "alkyl" group refers to a saturated aliphatic hydrocarbon group containing 1-12 (e.g., 1-8, 1-6, or 1-4) carbon atoms. An alkyl group can be straight or branched. Examples of alkyl groups include, but are not limited to, methyl, ethyl, propyl, isopropyl, butyl, isobutyl, sec-butyl, tert-butyl, n-pentyl, n-heptyl, or 2-ethylhexyl. An alkyl group can be substituted (i.e., optionally substituted) with one or more substituents such as halo, phospho, cycloaliphatic [e.g., cycloalkyl or cycloalkenyl], heterocycloaliphatic [e.g., heterocycloalkyl or heterocycloalkenyl], aryl, heteroaryl, alkoxy, aroyl, heteroaroyl, acyl [e.g., (aliphatic) carbonyl, (cycloaliphatic)carbonyl, or (heterocycloaliphatic) carbonyl], nitro, cyano, amido [e.g., (cycloalkylalkyl)carbonylamino, arylcarbonylamino, aralkylcarbonylamino, (heterocycloalkyl) carbonylamino, (heterocycloalkylalkyl) carbonylamino, heteroarylcarbonylamino, heteroaralkyl carbonylamino alkylaminocarbonyl, cycloalkylaminocarbonyl, heterocycloalkylaminocarbonyl, arylaminocarbonyl, or heteroarylaminocarbonyl], amino [e.g., aliphaticamino, cycloaliphatic amino, or heterocycloaliphaticamino], sulfonyl [e.g., aliphatic-$SO_2$—], sulfinyl, sulfanyl, sulfoxy, urea, thiourea, sulfamoyl, sulfamide, oxo, carboxy, carbamoyl, cycloaliphaticoxy, heterocyclo aliphaticoxy, aryloxy, heteroaryloxy, aralkyloxy, heteroarylalkoxy, alkoxycarbonyl, alkyl carbonyloxy, or hydroxy. Without limitation, some examples of substituted alkyls include carboxyalkyl (such as HOOC-alkyl, alkoxycarbonylalkyl, and alkylcarbonyloxyalkyl), cyanoalkyl, hydroxyalkyl, alkoxyalkyl, acylalkyl, aralkyl, (alkoxyaryl)alkyl, (sulfonylamino) alkyl (such as (alkyl-$SO_2$-amino)alkyl), aminoalkyl, amidoalkyl, (cycloaliphatic)alkyl, or haloalkyl.

As used herein, an "alkenyl" group refers to an aliphatic carbon group that contains 2-8 (e.g., 2-12, 2-6, or 2-4) carbon atoms and at least one double bond. Like an alkyl group, an alkenyl group can be straight or branched. Examples of an alkenyl group include, but are not limited to allyl, isoprenyl, 2-butenyl, and 2-hexenyl. An alkenyl group can be optionally substituted with one or more substituents such as halo, phospho, cycloaliphatic [e.g., cycloalkyl or cycloalkenyl], heterocycloaliphatic [e.g., heterocycloalkyl or hetero cycloalkenyl], aryl, heteroaryl, alkoxy, aroyl, heteroaroyl, acyl [e.g., (aliphatic) carbonyl, (cycloaliphatic) carbonyl, or (heterocycloaliphatic)carbonyl], nitro, cyano, amido [e.g., (cycloalkylalkyl)carbonylamino, arylcarbonylamino, aralkylcarbonylamino, (hetero cycloalkyl) carbonylamino, (heterocyclo alkylalkyl) carbonylamino, heteroarylcarbonylamino, heteroaralkylcarbonylamino alkylamino carbonyl, cycloalkylaminocarbonyl, hetero cyclo alkylaminocarbonyl, arylaminocarbonyl, or heteroarylaminocarbonyl], amino [e.g., aliphaticamino, cycloaliphaticamino, heterocyclo aliphaticamino, or aliphaticsulfonylamino], sulfonyl [e.g., alkyl-$SO_2$—, cycloaliphatic-$SO_2$—, or aryl-$SO_2$—], sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroaralkoxy, alkoxycarbonyl, alkylcarbonyloxy, or hydroxy. Without limitation, some examples of substituted alkenyls include cyanoalkenyl, alkoxyalkenyl, acylalkenyl, hydroxyl alkenyl, aralkenyl, (alkoxyaryl) alkenyl, (sulfonylamino)alkenyl (such as (alkyl-$SO_2$-amino) alkenyl), aminoalkenyl, amidoalkenyl, (cycloaliphatic)alkenyl, or haloalkenyl.

As used herein, an "alkynyl" group refers to an aliphatic carbon group that contains 2-8 (e.g., 2-12, 2-6, or 2-4) carbon atoms and has at least one triple bond. An alkynyl group can be straight or branched. Examples of an alkynyl group include, but are not limited to, propargyl and butynyl. An alkynyl group can be optionally substituted with one or more substituents such as aroyl, heteroaroyl, alkoxy, cycloalkyloxy, heterocycloalkyloxy, aryloxy, heteroaryloxy, aralkyl oxy, nitro, carboxy, cyano, halo, hydroxy, sulfo, mercapto, sulfanyl [e.g., aliphaticsulfanyl or cycloaliphaticsulfanyl], sulfinyl [e.g., aliphaticsulfinyl or cycloaliphaticsulfinyl], sulfonyl [e.g., aliphatic-$SO_2$—, aliphaticamino-$SO_2$—, or cycloaliphatic-$SO_2$—], amido [e.g., aminocarbonyl, alkylaminocarbonyl, alkylcarbonylamino, cyclo alkylaminocarbonyl, heterocycloalkylaminocarbonyl, cycloalkylcarbonylamino, arylamino carbonyl, arylcarbonylamino, aralkylcarbonylamino, (heterocycloalkyl) carbonylamino, (cycloalkylalkyl) carbonylamino, heteroaralkylcarbonylamino, heteroaryl carbonylamino or heteroaryl amino carbonyl], urea, thiourea, sulfamoyl, sulfamide, alkoxycarbonyl, alkyl carbonyloxy, cyclo aliphatic, heterocycloaliphatic, aryl, heteroaryl, acyl [e.g., (cycloaliphatic) carbonyl or (hetero cyclo aliphatic)carbonyl], amino [e.g., aliphaticamino], sulfoxy, oxo, carboxy, carbamoyl, (cycloaliphatic)oxy, (heterocyclo aliphatic) oxy, or (heteroaryl) alkoxy.

As used herein, an "amino" group refers to —$NR^X R^Y$ wherein each of $R_X$ and $R^Y$ is independently hydrogen, alkyl, cycloakyl, (cycloalkyl)alkyl, aryl, aralkyl, heterocycloalkyl, (heterocycloalkyl)alkyl, heteroaryl, carboxy, sulfanyl, sulfinyl, sulfonyl, (alkyl)carbonyl, (cycloalkyl)carbonyl, ((cycloalkyl)alkyl)carbonyl, arylcarbonyl, (aralkyl)carbonyl, (heterocyclo alkyl) carbonyl, ((heterocycloalkyl)alkyl)carbonyl, (heteroaryl)carbonyl, or (heteroaralkyl) carbonyl, each of which being defined herein and being optionally substituted. Examples of amino groups include alkylamino, dialkylamino, or arylamino. When the term "amino" is not the terminal group (e.g., alkylcarbonylamino), it is represented by —$NR^X$—. $R^X$ has the same meaning as defined above.

As used herein, a "cycloalkyl" group refers to a saturated carbocyclic mono- or bicyclic (fused or bridged) ring of 3-10 (e.g., 5-10) carbon atoms. Examples of cycloalkyl groups include cyclopropyl, cyclobutyl, cyclopentyl, cyclohexyl, cycloheptyl, adamantyl, norbornyl, cubyl, octahydroindenyl, decahydro-naphthyl, bicyclo[3.2.1]octyl, bicyclo [2.2.2]octyl, bicyclo[3.3.1]nonyl, bicyclo[3.3.2.]decyl, bicyclo[2.2.2]octyl, adamantyl, or ((aminocarbonyl)cycloalkyl)cycloalkyl.

As used herein, a "heterocycloalkyl" group refers to a 3-10 membered mono- or bicylic (fused or bridged) (e.g., 5- to 10-membered mono- or bicyclic) saturated ring structure, in which one or more of the ring atoms is a heteroatom (e.g., N, O, S, or combinations thereof). Examples of a heterocycloalkyl group include piperidyl, piperazyl, tetrahydropyranyl, tetrahydrofuryl, 1,4-dioxolanyl, 1,4-dithianyl, 1,3-dioxolanyl, oxazolidyl, isoxazolidyl, morpholinyl, thiomorpholyl, octahydrobenzofuryl, octahydrochromenyl, octahydrothio chromenyl, octahydroindolyl, octahydropyrindinyl, decahydroquinolinyl, octahydrobenzo[b] thiopheneyl, 2-oxa-bicyclo[2.2.2]octyl, 1-aza-bicyclo[2.2.2]octyl, 3-aza-bicyclo[3.2.1]octyl, and 2,6-dioxa-tricyclo [3.3.1.0]nonyl. A monocyclic heterocycloalkyl group can be fused with a phenyl moiety to form structures, such as tetrahydroisoquinoline, which would be categorized as heteroaryls.

A "heteroaryl" group, as used herein, refers to a monocyclic, bicyclic, or tricyclic ring system having 4 to 15 ring atoms wherein one or more of the ring atoms is a heteroatom (e.g., N, O, S, or combinations thereof) and in which the monocyclic ring system is aromatic or at least one of the rings in the bicyclic or tricyclic ring systems is aromatic. A heteroaryl group includes a benzofused ring system having 2 to 3 rings. For example, a benzofused group includes benzo fused with one or two 4 to 8 membered heterocycloaliphatic moieties (e.g., indolizyl, indolyl, isoindolyl, 3H-indolyl, indolinyl, benzo[b]furyl, benzo[b]thiophenyl, quinolinyl, or isoquinolinyl). Some examples of heteroaryl are pyridyl, 1H-indazolyl, furyl, pyrrolyl, thienyl, thiazolyl, oxazolyl, imidazolyl, tetrazolyl, benzofuryl, isoquinolinyl, benzthiazolyl, xanthene, thioxanthene, phenothiazine, dihydroindole, benzo[1,3]dioxole, benzo[b]furyl, benzo[b] thiophenyl, indazolyl, benzimidazolyl, benzthiazolyl, puryl, cinnolyl, quinolyl, quinazolyl, cinnolyl, phthalazyl, quinazolyl, quinoxalyl, isoquinolyl, 4H-quinolizyl, benzo-1,2,5-thiadiazolyl, or 1,8-naphthyridyl.

Without limitation, monocyclic heteroaryls include furyl, thiophenyl, 2H-pyrrolyl, pyrrolyl, oxazolyl, thazolyl, imidazolyl, pyrazolyl, isoxazolyl, isothiazolyl, 1,3,4-thiadiazolyl, 2H-pyranyl, 4-H-pranyl, pyridyl, pyridazyl, pyrimidyl, pyrazolyl, pyrazyl, or 1,3,5-triazyl. Monocyclic heteroaryls are numbered according to standard chemical nomenclature.

Without limitation, bicyclic heteroaryls include indolizyl, indolyl, isoindolyl, 3H-indolyl, indolinyl, benzo[b]furyl, benzo[b]thiophenyl, quinolinyl, isoquinolinyl, indolizinyl, isoindolyl, indolyl, benzo[b]furyl, bexo[b]thiophenyl, indazolyl, benzimidazyl, benzthiazolyl, purinyl, 4H-quinolizyl, quinolyl, isoquinolyl, cinnolyl, phthalazyl, quinazolyl, quinoxalyl, 1,8-naphthyridyl, or pteridyl. Bicyclic heteroaryls are numbered according to standard chemical nomenclature.

As used herein, the term "treat rate" refers to the weight percent of a component in the lubricating and cooling fluids. For example, the treat rate of a specific polymer or additive in an oil composition is the weight percent of the polymer or additive in the composition: treat rate=(weight of the polymer/additive in an oil free basis)/(weight of the entire composition)×100%. As mentioned above, treat rate of the polymers/additives herein refers to the solids of the polymer/additive absent any oil or carrier fluid.

As used herein the term "viscosity index" is an arbitrary measure for the change of viscosity with variations in temperature. The viscosity index can be calculated using the Formula: VI=100*[(L−U)/(L−H)], where L=kinematic viscosity at 40° C. of an oil of 0 viscosity index having the same kinematic viscosity at 100° C. as the oil whose viscosity index is to be calculated, mm$^2$/s (cSt);

H=kinematic viscosity at 40° C. of an oil of 100 viscosity index having the same kinematic viscosity at 100° C. as the oil whose viscosity index is to be calculated mm$^2$/s (cSt); and U=kinematic viscosity at 40° C. of the oil whose viscosity index is to be calculated mm$^2$/s (cSt).

The weight average molecular weight (Mw) and the number average molecular weight (Mn) may be determined with a gel permeation chromatography (GPC) instrument obtained from Waters or the like instrument and the data processed with Waters Empower Software or the like software. The GPC instrument may be equipped with a Waters Separations Module and Waters Refractive Index detector (or the like optional equipment). The GPC operating conditions may include a guard column, 4 Agilent PLgel columns (length of 300×7.5 mm; particle size of 5μ, and pore size ranging from 100-10000 Å) with the column temperature at about 40° C. Un-stabilized HPLC grade tetrahydrofuran (THF) may be used as solvent, at a flow rate of 1.0 mL/min. The GPC instrument may be calibrated with commercially available poly(methyl methacrylate) (PMMA) standards having a narrow molecular weight distribution ranging from 960-1,568,000 g/mol. The calibration curve can be extrapolated for samples having a mass less than 500 g/mol. Samples and PMMA standards can be in dissolved in THF and prepared at concentration of 0.1 to 0.5 wt. % and used without filtration. GPC measurements are also described in U.S. Pat. No. 5,266,223, which is incorporated herein by reference. The GPC method additionally provides molecular weight distribution information; see, for example, W. W. Yau, J. J. Kirkland and D. D. Bly, "Modern Size Exclusion Liquid Chromatography", John Wiley and Sons, New York, 1979, also incorporated herein by reference.

As discussed, the lubricating and cooling fluids herein are particularly suited for electric and hybrid-electric vehicles. Electric vehicles are those including, but not limited to, a battery, such a lead battery, a nickel-hydrogen battery, a lithium-ion battery, and/or a fuel cell, and equipped with an electric motor. Hybrid-electric vehicles are those employing batteries, an electric motor, and an internal combustion engine in combination. The lubricants herein may be in contact with parts of the electric motor, magnet wires within the electric motor, and/or may be used for both the transmission and for cooling and lubricating the motor. For example, the lubricating compositions herein may be in contact with electrical windings and magnet wires found in the stator.

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise or apparent from the context of discussion in the Examples below and throughout this disclosure, all percentages, ratios, and parts noted in this disclosure are by weight. Unless otherwise described, exemplary reactions described herein and throughout this disclosure were generally performed in a 500 mL flask with overhead stirring, a condenser, temperature probe, and nitrogen supply. When necessary, the reactions were heated using an isomantle.

EXAMPLES

Insulated magnet wires were evaluated for breakdown voltage after aging in Comparative and Inventive lubricating and cooling fluids. Breakdown voltage was measured as the Dielectric Breakdown AC Voltage specified in Sections 70 to 76 of ASTM D1676-17 using the parameters as specified in Table 9 thereof for 6 wire twists. Each wire was prepared pursuant to section 3.8.4 of ANSI NEMA Magnet Wire standard 1000-2018. The twisted wires were placed in glass containers and immersed in about 75 grams of either the Comparative or Inventive lubricating and cooling fluids and about 1500 ppm of water. Each container was aged at about 150° C. for 5 days. The water added to the container was to increase the severity of the test. After aging, samples were allowed to cool to room temperature. The wires were removed from the containers and washed with heptane four times. The wires were allowed to air dry. The insulating material around each wire was removed from about 1 millimeter from the tip of the wire. Electrodes were then connected to the exposed wire tips for testing.

The following ester base oils were tested in the base oil systems of the Comparative and Inventive lubricating and cooling fluids. In each fluid, the base oil system comprised (i) one of the ester base oils described below and (ii) at least one other API Group IV polyalphaolefin base oil.

Ester base oil 1 (E-1): dibasic ester based on bis(6-methylheptyl) adipate was a branched diester having 6 internal carbons in the acid moiety and 8 carbons in the alcohol moiety. This branched diester had a KV 100C of about 2.7 cSt and had about 23.7 mol percent of ester groups (ester groups being —C(O)O— groups and E-1 has 2 such ester groups).

Ester base oil 2 (E-2): dibasic ester based on bis(8-methylnonyl) adipate was a branched diester having 6 internal carbons in the acid moiety and 10 carbons in the alcohol moiety. This branched diester had a KV 100C of 3.5 cSt and had about 20.6 mol percent of ester groups (ester groups being —C(O)O— groups and E-2 has 2 such ester groups).

Ester base oil 3 (E-3): linear monoester having about 16-18 carbons in the acid moiety and 20 linear carbons in the alcohol moiety ($C_{16-18}$-alkyl-COO—$C_{20}$ alkyl). This monoester had a KV 100C of about 5.4 cSt and had about 7.7 mol percent ester groups (ester groups being —C(O)O— groups and E-3 has 1 such ester group).

The following calcium or magnesium overbased detergents were tested in the Comparative and Inventive lubricating and cooling fluids:

Detergent 1 (DET-1): overbased calcium sulfonate detergent (approximately 300 TBN, 11.9% calcium, and 25% soap content).

Detergent 2 (DET-2): overbased magnesium sulfonate detergent (approximately 400 TBN, 9.6% magnesium).

Each Comparative and Inventive fluid also included the same amounts and same set of additional fluid additives, which included dispersants, friction modifiers, antioxidants, metal passivator, extreme pressure agents, antifoam agents, and demulsifier.

Example 1

An insulated 15 American Wire Gauge (AWG) magnet wire having a 200° C. thermal rating with a polyester (amide)(imide) inner insulation over-coated with polyamideimide outer insulation layer (wire A) was aged in the Comparative and Inventive fluids of Tables 2 to 4 below for 5 days at 150° C. After aging, the wire was washed in heptane and the breakdown voltage was measured as reported in each table and shown in the graph of FIG. 1. A second 15 AWG magnet wire having a 180° C. thermal rating with a single polyester insulation layer (wire B) was also tested for comparison in Table 2. The base oil systems included the ester base oil and the PAO base oil set forth in each table.

TABLE 2

Lubricating and Cooling Fluids with Ester Base Oil-1

| Ingredient | C-1 | I-1 | I-2 | I-3 | I-4 | I-5 | C-2 |
|---|---|---|---|---|---|---|---|
| Wire | A | A | A | A | A | A | B |
| Det-1 | 0.18% | 0.18% | 0.18% | 0.36% | 0.54% | — | 0.36% |
| Det-2 | — | — | — | — | — | 0.54% | — |
| E-1 | 9.0% | 36.1% | 72.2% | 36.1% | 72.2% | 36.1% | 36.1% |
| PAO[1] | 81.2% | 54.1% | 18.0% | 54.1% | 18.0% | — | — |
| PAO[2] | | | | | | 53.8% | 54.1% |
| % ester base oil in the base oil system | 10% | 40% | 80% | 40% | 80% | 40% | 40% |
| kV 100 C of Finished Fluid (cSt) | 67.6 | 24.8 | 6.7 | 21.9 | 3.7 | 4.3 | 4.2 |
| TBN of Finished Fluid | 2.5 | 2.4 | 2.4 | 2.9 | 3.4 | 4 | 2.2 |
| Breakdown voltage (V) | 9,330 | 12,409 | 15,246 | 14,736 | 15,242 | 15,243 | <1,000 |
| Calcium (ppm) in Finished Fluid* | 214 | 214 | 214 | 428 | 642 | — | 428 |
| Magnesium (ppm) in Finished Fluid* | — | — | — | — | — | 518 | — |
| Ratio of detergent metal to ester groups in base oil system (ppm/% mols)** | 90.3 | 22.6 | 11.3 | 45.1 | 33.9 | 54.6 | 45.2 |

[1]PAO: 100 cSt at KV100
[2]PAO: 4 cSt at KV100
*metal content was calculated from amounts of calcium or magnesium provided by Det-1 or Det 2. No other source of calcium or magnesium was present in the fluids.
**Ratio of metal to ester groups in base oil system is ppm of detergent metal divided by mol percent of ester groups in the base oil system (for instance, the ratio for fluid C-1 was calculated from the 214 ppm calcium from the detergent and the 23.7 mol % of ester groups from the E-1 ester base oil included at 10% in the base oil system or 214/(23.7% × 10%) = 90.3)

TABLE 3

Lubricating and Cooling Fluids with Ester Base Oil-2

| Ingredient | C-3 | I-6 | I-7 |
|---|---|---|---|
| Wire | A | A | A |
| Det-1 | 0.18% | 0.18% | 0.18% |
| E-2 | 9.0% | 36.1% | 72.2% |
| PAO[1] | 81.2% | 54.1% | 18.0% |
| % ester base oil in the base oil system | 10% | 40% | 80% |
| kV 100 C of Finished Fluid (cSt) | 70.38 | 28.23 | 8.4 |
| TBN of Finished Fluid | 2.4 | 2.5 | 2.4 |
| Breakdown voltage (V) | 9,259 | 12,979 | 14,583 |
| Calcium (ppm) in Finished Fluid* | 214 | 214 | 214 |
| Ratio detergent metal to ester groups in base oil system (ppm/% mols)** | 104.0 | 26.0 | 13.0 |

[1]PAO: 100 cSt at kV100 C
*metal content was calculated from amounts of calcium provided by Det-1. No other source of calcium was present in the fluids.
**Ratio of metal to ester groups in base oil system is ppm of detergent metal divided by mol percent of ester groups in the base oil system (for instance, the ratio for fluid C-3 was calculated from the 214 ppm calcium from the detergent and the 20.6 mol % of ester groups from the E-2 ester base oil included at 10% in the base oil system or 214/(20.6% × 10%) = 104.0)

TABLE 4

Lubricating and Cooling Fluids with Ester Base Oil-3

| Ingredient | C-4 | C-5 | I-8 | I-9 |
|---|---|---|---|---|
| Wire | A | A | A | A |
| Det-1 | 0.18% | 0.18% | 0.18% | 0.18% |
| E-3 | 9.0% | 18.0% | 36.1% | 72.2% |
| PAO[1] | 81.2% | 72.2% | 54.1% | 18.04% |
| % ester base oil in the base oil system | 10% | 20% | 40% | 80% |
| kV 100 C of Finished Fluid (cSt) | 73.0 | 56.6 | 33.4 | 11.65 |
| TBN of finished Fluid | 2.5 | 2.5 | 2.5 | 2.5 |
| Breakdown voltage | 4,805 | 9,730 | 10,613 | 12,188 |
| Calcium(ppm) in Finished Fluid* | 214 ppm | 214 ppm | 214 ppm | 214 ppm |
| Ratio detergent metal to ester groups in base oil system (ppm/% mols)** | 278.0 | 139.0 | 69.5 | 34.7 |

[1]PAO: 100 cSt at kV100 C
*metal content was calculated from amounts of calcium provided by Det-1. No other source of calcium was present in the fluids.
**Ratio of metal to ester groups in base oil system is ppm of detergent metal divided by mol percent of ester groups in the base oil system (for instance, the ratio for fluid C-4 was calculated from the 214 ppm calcium from the detergent and the 7.7 mol % of ester groups from the E-3 ester base oil included at 10% in the base oil system or 214/(7.7% × 10%) = 278.0)

FIG. 1 includes a chart of breakdown voltage relative to the ratio of detergent metals to the mol percent of ester groups (—C(O)O—) in the base oil system. As shown in the box in the upper left corner, fluids with a ratio of about 70 or less (or about 10 to about 70) when combined with wire A achieved high breakdown voltage of 10,000 volts or higher.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A system including a lubricating fluid and an insulated magnet wire, the system comprising:
    a lubricating fluid including (i) a detergent system providing at least about 50 ppm metal to the fluid; (ii) a base oil system including a first base oil of lubricating viscosity blended with an ester base oil, wherein the base oil system includes at least about 20 weight percent of the ester base oil and providing ester groups to the base oil system; and (iii) a ratio of the metal provided by the detergent system to mol percent of ester groups in the base oil system of the lubricating fluid of about 70 or less;
    an insulated magnet wire having an insulation coating thereon with a thermal rating of about 190° C. to about 210° C., wherein the insulation coating of the magnet wire includes one or more layers and wherein an outermost layer of the insulation coating has a composition including a polyamide, a polyimide, a poly(amide/imide), combinations thereof, blends thereof, or copolymers thereof; and
    wherein the lubricating fluid contacts the outermost layer of the insulated magnet wire.

2. The system of claim 1, wherein the insulated magnet wire in contact with the lubricating fluid has a breakdown voltage of about 10,000 volts or higher.

3. The system claim 1, wherein the insulated magnet wire includes a wire having an AWG gauge of 14 to 30.

4. The system of claim 3, wherein the magnet wire is copper.

5. The system of claim 1, wherein an outer surface of the insulated magnet wire contacts the lubricating fluid.

6. The system of claim 1, wherein the ester base oil includes a branched diester.

7. The system of claim 6, wherein the branched diester is a reaction product of one or more dicarboxylic acids having an internal carbon chain length of 6 to 10 and one or more alcohols having a branched carbon chain length of 6 to 12 carbons.

8. The system of claim 1, wherein the ester base oil includes a monoester and/or a diester having the structure of Formula I:

(Formula I)

wherein $R_1$ is a carbon chain having m−2 carbons with m being an integer from 6 to 10, $R_2$ and $R_3$ are the same or different and include C8 to C20 linear or branched alkyl chains, and n is an integer of 0 or 1.

9. The system of claim 8, wherein n is 1 and $R_2$ and $R_3$ are the same or different and include C8 to C10 branched alkyl chains.

10. The system of claim 1, wherein the ester base oil is selected from a dibasic ester based on bi (6-methylheptyl) adipate; a dibasic ester based on bis(8-methylnonyl) adipate; or a linear monoester having about 16 to about 18 carbons in an acid moiety thereof and about 20 linear carbons in an alcohol moiety thereof; or combinations thereof.

11. The system of claim 1, wherein the detergent system includes alkali or alkaline metal salts of phenates, sulfonates, calixarates, salixrates, salicylates, carboxylic acids, sulfurized derivatives thereof, or combinations thereof.

12. The system of claim 11, wherein the alkali or alkaline metal includes calcium, magnesium, potassium, sodium, lithium, barium, or mixtures thereof.

13. The system of claim 1, wherein the detergent system provides no more than 800 ppm of the metal.

14. The system vehicle of claim 1, wherein the first base oil of the base oil system is a mineral or synthetic base oil.

15. The system of claim 1, wherein the first base oil of the base oil system is a polyalphaolefin.

16. A method of lubricating an electric motor of a hybrid or hybrid-electric vehicle, the method comprising:
lubricating an electric motor with a lubricating fluid;
wherein the electric motor includes at least one insulated magnet wire having an insulation coating thereon, wherein the insulation coating includes one or more layers and wherein an outermost layer includes a polyamide, a polyimide, a poly(amide/imide), a combination thereof, blends thereof, or copolymers thereof, and wherein the insulation coating of the magnet wire has a thermal rating of about 190° C. to about 200° C.;
wherein the lubricating fluid includes (i) a detergent system providing at least about 50 ppm metal to the fluid; (ii) a base oil system including a first base oil of lubricating viscosity blended with an ester base oil, wherein the base oil system includes at least about 20 weight percent of the ester base oil and providing ester groups to the base oil system; and (iii) a ratio of the metal provided by the detergent system to mol percent of ester groups in the base oil system of the lubricating fluid of about 70 or less; and
wherein the lubricating fluid contacts the outmost layer of the insulated magnet wire.

17. The method of claim 16, wherein the insulated magnet wire in contact with the lubricating fluid has a breakdown voltage of about 10,000 volts or higher.

18. The method of claim 16, wherein the ester base oil includes a branched diester.

19. The method of claim 18, wherein the branched diester is a reaction product of one or more dicarboxylic acids having an internal carbon chain length of 6 to 10 and one or more alcohols having a branched carbon chain length of 6 to 12 carbons.

20. The method of claim 16, wherein the ester base oil includes a monoester and/or a diester having the structure of Formula I:

(Formula I)

wherein $R_1$ is a carbon chain having m−2 carbons with m being an integer from 6 to 10, $R_2$ and $R_3$ are the same or different and include C8 to C20 linear or branched alkyl chains, and n is an integer of 0 or 1.

21. The method of claim 20, wherein n is 1 and $R_2$ and $R_3$ are the same or different and include C8 to C10 branched alkyl chains.

22. The method of claim 16, wherein the ester base oil is selected from a dibasic ester based on bi(6-methylheptyl) adipate; a dibasic ester based on bis(8-methylnonyl)adipate; or a linear monoester having about 16 to about 18 carbons in an acid moiety thereof and about 20 linear carbons in an alcohol moiety thereof.

23. The method of claim 16, wherein the detergent system provides no more than 800 ppm of the metal.

* * * * *